United States Patent
Huang et al.

(10) Patent No.: US 11,405,865 B2
(45) Date of Patent: Aug. 2, 2022

(54) MULTISTATION COORDINATION-BASED DATA TRANSMISSION METHOD AND APPARATUS

(71) Applicant: Huawei Technologies Co., Ltd., Guangdong (CN)

(72) Inventors: Qianyi Huang, Hong Kong (CN); Qian Zhang, Hong Kong (CN); Yunbo Li, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 91 days.

(21) Appl. No.: 16/949,794

(22) Filed: Nov. 13, 2020

(65) Prior Publication Data

US 2021/0068052 A1 Mar. 4, 2021

Related U.S. Application Data

(63) Continuation of application No. PCT/CN2019/086758, filed on May 14, 2019.

(30) Foreign Application Priority Data

May 18, 2018 (CN) .......................... 201810480241.9

(51) Int. Cl.
*H04W 52/02* (2009.01)
*H04W 52/34* (2009.01)
*H04W 72/04* (2009.01)

(52) U.S. Cl.
CPC ... *H04W 52/0216* (2013.01); *H04W 52/0229* (2013.01); *H04W 52/34* (2013.01); *H04W 72/0446* (2013.01)

(58) Field of Classification Search
CPC ......... H04W 52/0216; H04W 52/0229; H04W 52/34; H04W 52/38; H04W 52/0209;
(Continued)

(56) References Cited

U.S. PATENT DOCUMENTS 10,470,018 B2 * 11/2019 Hampel ............ H04W 72/0446
2011/0255444 A1 10/2011 Soliman et al.
(Continued)

FOREIGN PATENT DOCUMENTS

| CN | 101583183 A | 11/2009 | |
|---|---|---|---|
| CN | 103684662 A * | 3/2014 | ........... H04L 1/0003 |

(Continued)

*Primary Examiner* — Yemane Mesfin
*Assistant Examiner* — Intekhaab A Siddiquee
(74) *Attorney, Agent, or Firm* — Womble Bond Dickinson (US) LLP

(57) ABSTRACT

Embodiments of this application provide a multistation coordination-based data transmission method and apparatus. The method includes: receiving, by a station, second data of another station, different from the station, in a coordination group to which the station belongs; sending, by the station, first data to the other station, so that the other station generates a second aggregated frame that includes the first data and the second data; and sending, by the station, a first aggregated frame to an access point. The first aggregated frame includes the first data and the second data. This reduces a transmit power of a single station, and prolongs a service lifespan of the station.

20 Claims, 16 Drawing Sheets

(58) Field of Classification Search
CPC ............. H04W 52/262; H04W 52/346; H04W 72/0446; H04W 4/70; H04B 7/026; H04B 7/024; Y02D 30/70
USPC ........................................................ 370/311
See application file for complete search history.

(56) References Cited

U.S. PATENT DOCUMENTS

| | | |
|---|---|---|
| 2013/0099806 A9 | 4/2013 | Hill |
| 2016/0373150 A1 | 12/2016 | Roberts et al. |

FOREIGN PATENT DOCUMENTS

| | | |
|---|---|---|
| CN | 103684662 A | 3/2014 |
| CN | 107005786 A | 8/2017 |
| CN | 107787018 A | 3/2018 |
| WO | 2017112207 A1 | 6/2017 |

* cited by examiner

MULTISTATION COORDINATION-BASED DATA TRANSMISSION METHOD AND APPARATUS

CROSS-REFERENCE TO RELATED APPLICATIONS

This application is a continuation of International Application No. PCT/CN2019/086758, filed on May 14, 2019, which claims priority to Chinese Patent Application No. 201810480241.9, filed on May 18, 2018, the disclosures of which are incorporated herein by reference in their entireties.

TECHNICAL FIELD

This application relates to the field of communications technologies, and in particular, to a multistation coordination-based data transmission method and apparatus.

BACKGROUND

With development of wireless communications technologies, a wireless communications device affects all production and household aspects. In the future, wireless communication devices will play an important role in industrial production, smart city, smart home, and health management.

Some devices, such as an internet of things device, in a wireless communications device usually runs on a button cell. To prolong a lifespan of the wireless communications device, power consumption of the wireless communications device, including power consumption of wireless transmission, needs to be maximally reduced.

However, when an operating current of the button cell in the wireless communications device increases, an effective capacity of the battery decreases. As shown in FIG. 2, when the current is 500 uA, the battery capacity is 230-240 mAh. When the current is 2.5 mA, the battery capacity is 175 mAh. To enlarge a transmission range of the wireless communications device, generally, a transmit current needs to be increased for the wireless communications device, to increase a transmit power of the wireless communication device. Consequently, when the transmit power of the wireless communications device is increased, the battery capacity is reduced, and a battery lifespan of the communications device is shortened.

Therefore, it is crucial to reduce a transmit power of a wireless communications device in a communication process and prolong a battery lifespan.

SUMMARY

This application provides a multistation coordination-based data transmission method and apparatus, to reduce a transmit power of a single station in a transmission process and prolong a battery lifespan through multistation coordination.

According to a first aspect, this application provides a data transmission method, including:

A station receives second data of one or more other stations, different from the station, in a coordination group to which the station belongs. The station sends first data to each of the one or more other stations, so that the one or more other stations each generate a second aggregated frame. The second aggregated frame includes the first data and the second data.

Further, the station sends a first aggregated frame that includes the first data and the second data to an access point. A time at which the station sends the first aggregated frame is the same as a time at which the one or more other stations each send the second aggregated frame to the access point, and an aggregation order of the first data and the second data in the first aggregated frame is the same as an aggregation order of the first data and the second data in the second aggregated frame. A transmit power at which the station sends the first aggregated frame is less than a power at which the station sends only the first data to the access point, and a transmit power at which the one or more other stations each send the second aggregated frame is less than a power at which the one or more other stations each send only the second data to the access point. In this solution, through multistation coordination, a single station can more or less reduce its own transmit power. When a low transmit power is used for sending, a total capacity of a battery increases significantly. Therefore, through multistation coordination, a battery lifespan of each station can be prolonged and transmission efficiency can be ensured.

In an embodiment, the transmit power of the station is the power at which the station sends only the first data to the access point multiplied by a transmit power coefficient of the station, and for any one of the one or more other stations, a transmit power of the station is the power at which the other station sends only the second data multiplied by a transmit power coefficient of the other station. The transmit power coefficient of the station is greater than 0 and less than 1, the transmit power coefficient of the other station is greater than 0 and less than 1, and a sum of the transmit power coefficient of the station and transmit power coefficients of the one or more other stations is greater than or equal to 1.

In an embodiment, the transmit power coefficient of the station is equal to the transmit power coefficient of each of the one or more other stations, and a value of the transmit power coefficient is 1/N. N is a total quantity of the station and the one or more other stations, and N is a positive integer greater than or equal to 2.

In an embodiment, before the station receives the second data of the one or more other stations, the method further includes:

The station receives a trigger frame broadcast by the access point. The trigger frame includes information required by the station for determining the transmit power of the station.

In an embodiment, the information includes the transmit power coefficient of the station. The trigger frame further includes the transmit power coefficients of the one or more other stations.

In an embodiment, the information is a target received signal strength indicator field in a user information field that is in the trigger frame and that is corresponding to the station, and the target received signal strength indicator field indicates the transmit power.

In an embodiment, the information is a resource allocation field and a target received signal strength indication field that are in the trigger frame and that are corresponding to the station. The resource allocation field corresponding to the station indicates the transmit power coefficient of the station, and the target received signal strength indication field is used by the station to determine the power at which the station sends only the first data.

In an embodiment, first fields in user information fields that are in the trigger frame and that are corresponding to stations in the coordination group are the same, and the first field is used to indicate a resource unit that carries the aggregated frame. In other words, the first field in the user information field that is in the trigger frame and that is corresponding to the station is the same as the first field in the user information field that is in the trigger frame and that is corresponding to each of the one or more other stations. The first field of the station is used to indicate a resource unit that carries the first aggregated frame. The first field of each of the one or more other stations is used to indicate a resource unit that carries the second aggregated frame. The resource unit that carries the first aggregated frame is the same as the resource unit that carries the second aggregated frame.

Second fields in the user information fields that are in the trigger frame and that are corresponding to the stations in the coordination group are the same, and the second field is used to indicate a coding type of the aggregated frame. In other words, the second field in the user information field that is in the trigger frame and that is corresponding to the station is the same as the second field in the user information field that is in the trigger frame and that is corresponding to each of the one or more other stations. The second field of the station is used to indicate a coding type of the first aggregated frame. The second field of each of the one or more other stations is used to indicate a coding type of the second aggregated frame. The coding type of the first aggregated frame is the same as the coding type of the second aggregated frame.

Third fields in the user information fields that are in the trigger frame and that are corresponding to the stations in the coordination group are the same, and the third field is used to indicate a modulation and coding scheme of the aggregated frame. In other words, the third field in the user information field that is in the trigger frame and that is corresponding to the station is the same as the third field in the user information field that is in the trigger frame and that is corresponding to each of the one or more other stations. The third field of the station is used to indicate a modulation and coding scheme of the first aggregated frame. The third field of each of the one or more other stations is used to indicate a modulation and coding scheme of the second aggregated frame. The modulation and coding scheme of the first aggregated frame is the same as the modulation and coding scheme of the second aggregated frame.

Fourth fields in the user information fields that are in the trigger frame and that are corresponding to the stations in the coordination group are the same, and the fourth field is used to indicate dual-carrier modulation of the aggregated frame. In other words, the fourth field in the user information field that is in the trigger frame and that is corresponding to the station is the same as the fourth field in the user information field that is in the trigger frame and that is corresponding to each of the one or more other stations. The fourth field of the station is used to indicate dual-carrier modulation of the first aggregated frame. The fourth field of each of the one or more other stations is used to indicate dual-carrier modulation of the second aggregated frame. The dual-carrier modulation scheme of the first aggregated frame is the same as the dual-carrier modulation scheme of the second aggregated frame.

Fifth fields in the user information fields that are in the trigger frame and that are corresponding to the stations in the coordination group are the same, and the fifth field is used to indicate spatial stream allocation. In other words, the fifth field in the user information field that is in the trigger frame and that is corresponding to the station is the same as the fifth field in the user information field that is in the trigger frame and that is corresponding to each of the one or more other stations. The fifth field of the station is used to indicate spatial stream allocation of the first aggregated frame. The fifth field of each of the one or more other stations is used to indicate spatial stream allocation of the second aggregated frame. The spatial stream allocation mode of the first aggregated frame is the same as the spatial stream allocation mode of the second aggregated frame.

In an embodiment, before the station receives the second data of the one or more other stations, the method further includes:

The station sends a control frame to the one or more other stations. The control frame includes the transmit power coefficients of the one or more other stations.

In an embodiment, the control frame includes one common information field and (N−1) user information fields. (N−1) is a quantity of the one or more other stations, and N is a positive integer greater than or equal to 2.

(N−1) user information fields correspond one-to-one to the one or more other stations.

The common information field includes a first field, a second field, a third field, a fourth field, and a fifth field. The first field is used to indicate a resource unit that carries the aggregated frame, the second field is used to indicate a coding type of the aggregated frame, the third field is used to indicate a modulation and coding scheme of the aggregated frame, the fourth field is used to indicate dual-carrier modulation of the aggregated frame, and the fifth field is used to indicate spatial stream allocation.

In an embodiment, the aggregation order corresponds to an order in the user information fields in the trigger frame.

In an embodiment, the aggregation order corresponds to an order in user information fields in the control frame.

In an embodiment, the aggregation order corresponds to an order relationship between the stations in the coordination group.

In an embodiment, the aggregation order corresponds to a time sequence relationship between sending of the first data by the station and sending of the second data by the one or more other stations.

In an embodiment, before the station receives the second data of the one or more other stations, the method further includes: The station receives group target wake time information broadcast by the access point. The group target wake time information is used to indicate the stations in the coordination group to wake up.

The station wakes up based on the group target wake time information.

In an embodiment, before the station receives the second data of the one or more other stations, the method further includes: The station receives an association identifier that is corresponding to the coordination group and that is sent by the access point.

The station receives a management frame broadcast by the access point. A bit that is in the management frame and that is corresponding to the association identifier is 1, representing waking up the stations in the coordination group.

The station wakes up based on the management frame.

In an embodiment, before the station receives the second data of the one or more other stations, the method further includes:

The station wakes up based on the group target wake time information negotiated by the station and the one or more other stations. The group target wake time information indicates that the stations in the coordination group are to wake up at a preset time.

The station sends the group target wake time information to the access point.

In an embodiment, that the station sends the first aggregated frame to the access point includes:

The station sends the first aggregated frame to the access point in a space-time block coding (STBC) scheme.

In an embodiment, after the station sends the first aggregated frame to the access point, the method further includes:

When determining that no acknowledgment frame or block acknowledgment frame sent by the access point is received, the station sends acknowledgment request information to each of the one or more other stations in the coordination group. The acknowledgment frame indicates that the access point successfully receives the first aggregated frame, and the acknowledgment request information is used to determine whether any one of the one or more other stations receives the acknowledgment frame or the block acknowledgment frame.

The station receives acknowledgment response information sent by each of the one or more other stations.

When the received acknowledgment response information indicates that any one of the one or more other stations receives no acknowledgment frame, or the other station receives no block acknowledgment frame, or a bit corresponding to the station in the block acknowledgment frame received by the other station is 0, the station determines that the first data fails to be sent.

Alternatively, when the received acknowledgment response information indicates that any one of the one or more other stations receives the acknowledgment frame, or a bit corresponding to the station in the block acknowledgment frame received by the other station is 1, the station determines that the first data is successfully sent.

According to this solution, when determining that no acknowledgment frame or block acknowledgment frame sent by the access point is received, the station queries the one or more other stations in the coordination group about whether an acknowledgment frame or a block acknowledgment frame is received. This avoids retransmission of the station, reduces transmission overheads, and saves network resources.

In an embodiment, after the station sends the first aggregated frame to the access point, the method further includes:

When the station determines that no acknowledgment frame or block acknowledgment frame sent by the access point is received, or a block acknowledgment frame sent by the access point is received but a bit corresponding to the station in the block acknowledgment frame is 0, the station determines that the first data fails to be sent. The acknowledgment frame indicates that the access point successfully receives the first aggregated frame.

In an embodiment, after the station sends the first aggregated frame to the access point, the method further includes:

The station receives an acknowledgment frame or a block acknowledgment frame sent by the access point. The acknowledgment frame indicates that the access point successfully receives the first aggregated frame, and a bit corresponding to the station in the block acknowledgment frame is 1.

In an embodiment, before the station receives the second data of the one or more other stations, the method further includes:

The station sends a first grouping request frame to the access point. The first grouping request frame is used to request to form a coordination group with another station. Then, the access point sends a second grouping request frame to another station, and receives a first grouping response frame returned by the another station. The second grouping request frame includes an identifier of the coordination group. The first grouping response frame indicates that the another station determines to form the coordination group with the station.

The station receives a second grouping response frame sent by the access point. The second grouping response frame includes the identifier of the coordination group, and indicates that the another station determines to form the coordination group with the station.

In an embodiment, before the station receives the second data of the one or more other stations, the method further includes:

The station sends a third grouping request frame to another station. The third grouping request frame is used to request to form a coordination group with the another station. The third grouping request frame includes an identifier of the coordination group.

The station receives a third grouping response frame sent by the another station. The third grouping response frame indicates that the another station determines to form the coordination group with the station.

The station sends a grouping report frame to the access point. The grouping report frame includes the identifier of the coordination group.

The station receives a grouping confirm frame sent by the access point.

According to a second aspect, this application provides a data transmission method on an access point side, including:

An access point receives a first aggregated frame sent by a station, and receives a second aggregated frame or frames sent by one or more other stations, different from the station, in a coordination group to which the station belongs.

The first aggregated frame includes first data and second data, and the second aggregated frame includes the first data and the second data. The first data is data of the station, and the second data is data of the one or more other stations. An aggregation order of the first data and the second data in the first aggregated frame is the same as an aggregation order of the first data and the second data in the second aggregated frame.

In addition, a transmit power at which the station sends the first aggregated frame is less than a power at which the station sends only the first data to the access point, and a transmit power at which the one or more other stations each send the second aggregated frame is less than a power at which the one or more other stations each send only the second data to the access point. In this solution, a plurality of stations coordinate to send aggregated frames respectively generated, and powers of the aggregated frames are superposed on the access point side, so that a receive power of the access point during data reception is not reduced, and the access point side can normally receive data. In addition, a transmit power of a single station is reduced, and a battery lifespan is prolonged.

In an embodiment, the transmit power of the station is the power at which the station sends only the first data to the access point multiplied by a transmit power coefficient of the station, and for any one of the one or more other stations, a transmit power of the station is the power at which the other station sends only the second data multiplied by a transmit power coefficient of the other station. The transmit power coefficient of the station is greater than 0 and less than 1, the transmit power coefficient of the other station is greater than 0 and less than 1, and a sum of the transmit power coefficient of the station and transmit power coefficients of the one or more other stations is greater than or equal to 1.

In an embodiment, the transmit power coefficient of the station is equal to the transmit power coefficient of each of the one or more other stations, and a value of the transmit power coefficient is 1/N. N is a total quantity of the station and the one or more other stations, and N is a positive integer greater than or equal to 2.

In an embodiment, before the access point receives the first aggregated frame sent by the station, and receives the second aggregated frame sent by the one or more other stations, the method further includes:

The access point broadcasts a trigger frame. The trigger frame includes information required by the station for determining the transmit power.

In an embodiment, the information required by the station for determining the transmit power includes the transmit power coefficient of the station. The trigger frame further includes the transmit power coefficients of the one or more other stations.

In an embodiment, the information required by the station for determining the transmit power is a target received signal strength indication field in a user information field that is in the trigger frame and that is corresponding to the station, and the field indicates the transmit power.

In an embodiment, the information required by the station for determining the transmit power is a resource allocation field and the target received signal strength indication field that are in the trigger frame and that are corresponding to the station. The resource allocation field corresponding to the station indicates the transmit power coefficient of the station, and the target received signal strength indication field corresponding to the station is used by the station to determine the power at which the station sends only the first data.

In an embodiment, first fields in user information fields that are in the trigger frame and that are corresponding to stations in the coordination group are the same, and the first field is used to indicate a resource unit that carries the aggregated frame. Second fields in the user information fields that are in the trigger frame and that are corresponding to the stations in the coordination group are the same, and the second field is used to indicate a coding type of the aggregated frame. Third fields in the user information fields that are in the trigger frame and that are corresponding to the stations in the coordination group are the same, and the third field is used to indicate a modulation and coding scheme of the aggregated frame. Fourth fields in the user information fields that are in the trigger frame and that are corresponding to the stations in the coordination group are the same, and the fourth field is used to indicate dual-carrier modulation of the aggregated frame. Fifth fields in the user information fields that are in the trigger frame and that are corresponding to the stations in the coordination group are the same, and the fifth field is used to indicate spatial stream allocation.

In an embodiment, the aggregation order corresponds to an order in the user information fields in the trigger frame.

In an embodiment, the aggregation order corresponds to an order in user information fields in the control frame received by the station.

In an embodiment, the aggregation order corresponds to an order relationship between the stations in the coordination group.

In an embodiment, the aggregation order corresponds to a time sequence relationship between sending of the first data by the station and sending of the second data by the one or more other stations.

In an embodiment, before the access point receives the first aggregated frame sent by the station, and receives the second aggregated frame sent by the one or more other stations, different from the station, in the coordination group to which the station belongs, the method further includes:

The access point broadcasts group target wake time information. The group target wake time information is used to indicate the stations in the coordination group to wake up.

In an embodiment, before the access point receives the first aggregated frame sent by the station, and receives the second aggregated frame sent by the one or more other stations, different from the station, in the coordination group to which the station belongs, the method further includes:

The access point sends an association identifier corresponding to the coordination group to the station.

The access point broadcasts a management frame. A bit that is in the management frame and that is corresponding to the association identifier is 1, representing waking up the stations in the coordination group.

In an embodiment, before the access point receives the first aggregated frame sent by the station, and receives the second aggregated frame sent by the one or more other stations, different from the station, in the coordination group to which the station belongs, the method further includes:

The access point receives group target wake time information sent by the station. The group target wake time information is negotiated by the station and the other station in the coordination group, and the target wake time information indicates that the stations in the coordination group are to wake up at a preset time.

In an embodiment, after the access point receives the first aggregated frame sent by the station, and receives the second aggregated frame sent by the one or more other stations, different from the station, in the coordination group to which the station belongs, the method further includes:

The access point sends an acknowledgment frame or a block acknowledgment frame to the station. The acknowledgment frame indicates that the access point successfully receives the first aggregated frame, and a bit corresponding to the station in the block acknowledgment frame is 1 or 0.

In an embodiment, before the access point receives the first aggregated frame sent by the station, and receives the second aggregated frame sent by the one or more other stations, different from the station, in the coordination group to which the station belongs, the method further includes:

The access point receives a first grouping request frame sent by the station. The first grouping request frame is used by the station to request to form a coordination group with another station.

The access point sends a second grouping request frame to another station. The second grouping request frame includes an identifier of the coordination group.

The access point receives a first grouping response frame sent by the another station. The first grouping response frame indicates that the another station determines to form the coordination group with the station.

The access point sends a second grouping response frame to the station. The second grouping response frame includes the identifier of the coordination group, and indicates that the another station determines to form the coordination group with the station.

In an embodiment, before the access point receives the first aggregated frame sent by the station, and receives the second aggregated frame sent by the one or more other stations, different from the station, in the coordination group to which the station belongs, the method further includes:

The access point receives a grouping report frame sent by the station. The grouping report frame includes the identifier of a coordination group, and the grouping report frame is sent after the station and the another station determine to form the coordination group.

The access point sends the grouping confirm frame to the station.

According to a third aspect, a data transmission apparatus on a station side is provided. The apparatus may be a station, or may be a chip in a station. The function may be implemented by using hardware, or may be implemented by using hardware executing corresponding software. The hardware or software includes one or more units corresponding to the foregoing functions.

In an embodiment, when the apparatus is a station, the apparatus includes a processing module, a receiving module, and a sending module. The processing module may be, for example, a processor, the receiving module may be, for example, a receiver, and the sending module may be, for example, a transmitter. The receiving module may include a radio frequency circuit and a baseband circuit, and the sending module may include a radio frequency circuit and a baseband circuit.

In an embodiment, the apparatus may further include a storage unit, and the storage unit may be, for example, a memory. When the apparatus includes a storage unit, the storage unit is configured to store a computer-executable instruction. The processing module is connected to the storage unit. The processing module executes the computer-executable instruction stored in the storage unit, so that the apparatus is enabled to perform the foregoing data transmission method related to the function of the station.

In another embodiment, when the apparatus is a chip in a station, the chip includes a processing module, a receiving module, and a sending module. The processing module may be, for example, a processor, and the receiving module/sending module may be, for example, an input/output interface, a pin, or a circuit on the chip. In an embodiment, the apparatus may further include a storage unit, and the processing module may execute a computer-executable instruction stored in the storage unit, so that a chip in the apparatus is enabled to perform the data transmission method related to the function of the station in any one of the foregoing aspects.

In an embodiment, the storage unit is a storage unit in the chip, for example, a register or a cache. Alternatively, the storage unit may be a storage unit outside the chip in the station, for example, a read-only memory (read-only memory, ROM for short) or another type of static storage device that can store static information and an instruction, a random access memory (random access memory, RAM for short), or the like.

The processor mentioned anywhere above may be a general purpose central processing unit (CPU), a microprocessor, an application-specific integrated circuit (ASIC), or one or more integrated circuits configured to control program execution in the data transmission method in the foregoing aspects.

According to a fourth aspect, this application provides a data transmission apparatus on an access point side. The apparatus may be an access point, or may be a chip in an access point. The apparatus has a function of implementing various embodiments related to the access point in the foregoing aspects. The function may be implemented by using hardware, or may be implemented by using hardware executing corresponding software. The hardware or software includes one or more units corresponding to the foregoing functions.

In an embodiment, when the apparatus is the access point, the access point includes a processing module, a receiving module, and a sending module. The processing module may be, for example, a processor, the receiving module may be, for example, a receiver, and the sending module may be, for example, a transmitter. The receiver includes a radio frequency circuit, and the transmitter includes a radio frequency circuit. In an embodiment, the access point further includes a storage unit, and the storage unit may be, for example, a memory. When the access point includes a storage unit, the storage unit is configured to store a computer-executable instruction. The processing module is connected to the storage unit. The processing module executes the computer-executable instruction stored in the storage unit, so that the apparatus is enabled to perform the data transmission method related to the function of the access point in the second aspect.

In another embodiment, when the apparatus is a chip in an access point, the chip includes a processing module, a receiving module, and a sending module. The processing module may be, for example, a processor, the receiving module may be, for example, an input interface, a pin, or a circuit on the chip, and the sending module may be, for example, an output interface, a pin, or a circuit on the chip. The processing module may execute the computer-executable instruction stored in the storage unit, so that the chip in the access point is enabled to perform the data transmission method related to the function of the access point in the foregoing aspects. In an embodiment, the storage unit is a storage unit in the chip, for example, a register or a cache. Alternatively, the storage unit may be a storage unit outside the chip in the access point, for example, a ROM, another type of static storage device that can store static information and an instruction, or a RAM.

The processor mentioned anywhere above may be a CPU, a microprocessor, an ASIC, or one or more integrated circuits configured to control program execution in the data transmission method.

According to a fifth aspect, a computer storage medium is provided. The computer storage medium stores program code, and the program code is used to indicate an instruction for performing the method in any one of the first aspect or the embodiments of the first aspect.

According to a sixth aspect, a processor is provided. The processor is configured to be coupled to a memory, and is configured to perform the method in any one of the first aspect or the embodiments of the first aspect.

According to a seventh aspect, a computer program product including an instruction is provided. When the computer program product runs on a computer, the computer is enabled to perform the method in any one of the first aspect or the embodiments of the first aspect.

According to an eighth aspect, a computer storage medium is provided, where the computer storage medium stores program code, and the program code is used to indicate an instruction for performing the method in any one of the second aspect or the embodiments of the second aspect.

According to a ninth aspect, a processor is provided. The processor is configured to be coupled to a memory, and is configured to perform the method in any one of the second aspect or the embodiments of the second aspect.

According to a tenth aspect, a computer program product including an instruction is provided. When the computer program product runs on a computer, the computer is enabled to perform the method in any one of the second aspect or the embodiments of the second aspect.

According to an eleventh aspect, a communications system is provided. The system includes at least two stations according to any one of the third aspect or the embodiments of the third aspect. The system further includes the access point according to any one of the fourth aspect or the embodiments of the fourth aspect.

In the embodiment, a station in the coordination group generates an aggregated frame based on the first data of the station and the received second data, where the second data is data of the one or more other stations, different from the station, in the coordination group to which the station belongs. Then, stations that generate aggregated frames send respective aggregated frames to the access point at the same time. The one or more stations in the coordination group may separately perform the foregoing process. Data in aggregated frames generated by the stations that participate in coordination is the same, and aggregation orders of the data are also the same, thereby ensuring consistency of the aggregated frames of the different stations. According to the foregoing coordination process, a transmit power at which each station sends an aggregated frame is less than a power at which the station sends only data of the station to the access point, so that a total transmit power of the coordination group can still meet a requirement of normal reception on the access point side. This reduces a transmit power of a single station, and prolongs a service lifespan of the station. For an internet of things device in the internet of things, a total capacity of a battery of the internet of things device may be increased, and a service lifespan of the battery of the internet of things device may be prolonged.

DESCRIPTION OF EMBODIMENTS

Figure 1:
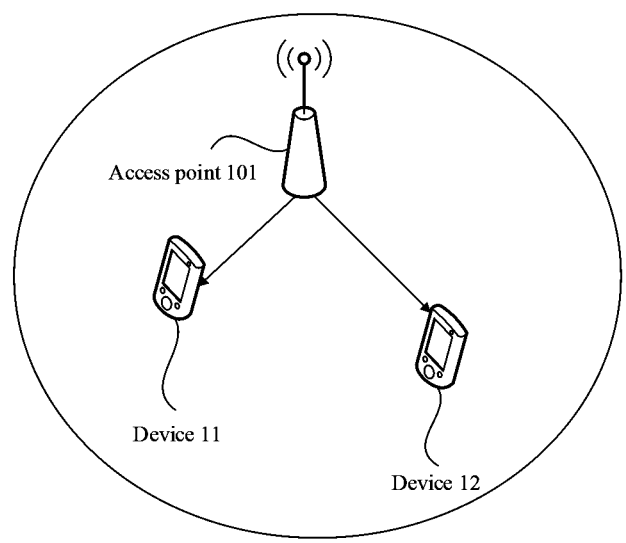
FIG. 1 is a diagram of a communication scenario of an internet of things device.

Terms used in DESCRIPTION OF EMBODIMENTS of this application are only used to explain specific embodiments of this application, and are not intended to limit this application.

It should be understood that the technical solutions in the embodiments of this application may be applied to various communications systems, for example, a wireless local area network (WLAN) communications system, a global system of mobile communications (global system of mobile communication, GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5G communications system, or another system that may appear in the future. The following explains some terms in this application, to help a person skilled in the art have a better understanding. For ease of description, the embodiments of this application are described by using the WLAN communications system as an example, and do not constitute a limitation on this application. In addition, it should be noted that when the solutions in the embodiments of this application are applied to another system, names of a station and an access point may change, however, this does not affect implementation of the solutions in the embodiments of this application.

The following describes the technical solutions of the embodiments in this application with reference to the accompanying drawings.

Technical terms used in this application are first explained:

(1) A station (station, STA) is also referred to as a station device. The station may be a device that provides voice and/or data connectivity for a user, for example, a handheld device or a vehicle-mounted device having a wireless connection function. The station may alternatively be a device for detecting data, for example, a sensor. The station may alternatively be an intelligent device, for example, a smart home device or a wearable device deployed indoors. Common terminal devices include, for example, an air quality monitoring sensor, a temperature sensor, a smoke sensor, a mobile phone, a tablet computer, a notebook computer, a palmtop computer, a mobile internet device (MID), and a wearable device. The wearable device includes, for example, a smartwatch, a smart band, and a pedometer. The station is a current and future possible wireless communications station or a limited communications station. For example, the station is a WLAN station, a cellular station, or the like.

(2) An access point (AP) is also referred to as an access point device. The access point device may be a network device or a radio access network (radio access network, RAN) device. The access point is a device that connects a station to a network by using a licensed spectrum and an unlicensed spectrum, and includes network devices in various communications standards, including but is not limited to: a wireless access point (for example, a wireless local area network access point), a base station, an evolved NodeB (eNB), a radio network controller (radio network controller, RNC), a NodeB (NB), a network device controller (base station controller, BSC), a base transceiver station (BTS), a home base station (for example, a home evolved NodeB, or a home Node B, HNB), a baseband unit (BBU), or the like.

(3) "A plurality of" means two or more, and another quantifier is similar to this.

(4) "Correspondence" may be an association relationship or a binding relationship, and that A corresponds to B means that there is an association relationship or a binding relationship between A and B.

It should be noted that nouns or terms in the embodiments of this application may be mutually referenced. Details are not described.

In the prior art, one access point is usually associated with a plurality of stations, and each station may separately send data of the station to the access point. Usually, to ensure signal quality of the access point, a station closer to the access point may send data to the access point at a lower transmit power, and a station farther from the access point may send data to the access point at a higher transmit power.

For example, with development of the internet of things (IoT) technology, internet of things devices (internet of things station, or IoT STA) are gradually applied to production and life. The internet of things is a network in which various information sensing devices are used to collect necessary information, in real time, about any object or process that needs to be monitored, connected, and interacted. The internet of things and the Internet form a huge network in combination, which connecting things and things, things and people, and all things and networks, facilitating identification, management, and control. The current internet of things devices conform to wireless communications protocols including IEEE (institute of electrical and electronics engineers) 802.15.4, 802.11n, Bluetooth low energy (BLE), and the like. The internet of things device usually runs on a button cell. In other words, the button cell supplies electricity to the internet of things device. Because internet of things devices are usually deployed in large buildings such as factories and airports, the internet of things devices need to support long-distance communication. However, because a capacity of the button cell is limited, to prolong a lifespan of the internet of things device, power consumption of the internet of things device needs to be maximally reduced. It can be learned that, for an internet of things device, in a communications standard for an internet of things device, requirements for low power consumption and long-distance communication of the internet of things device need to met. The communications standard for the internet of things device may be referred to as a wireless local area network-internet of things (WLAN-IoT) standard. FIG. 1 is a diagram of a communication scenario of an internet of things device. As shown in FIG. 1, in an internet of things communications standard, an internet of things device 11 closer to an access point 101 may use a lower transmit power, and an internet of things device 12 farther from the access point 101 may use a higher transmit power. This can increase a communication distance of the internet of things device 12, and ensure signal quality of the access point 101. For example, because a path loss of propagation of an electromagnetic wave in free space may be represented as free space path loss (dB)=20 $\log_{10}$(d)+20 $\log_{10}$(f)+32.44, when a transmission distance of the internet of things device 12 is doubled, a sending rate of the internet of things device 12 needs to be increased by 6 dB.

Figure 2:
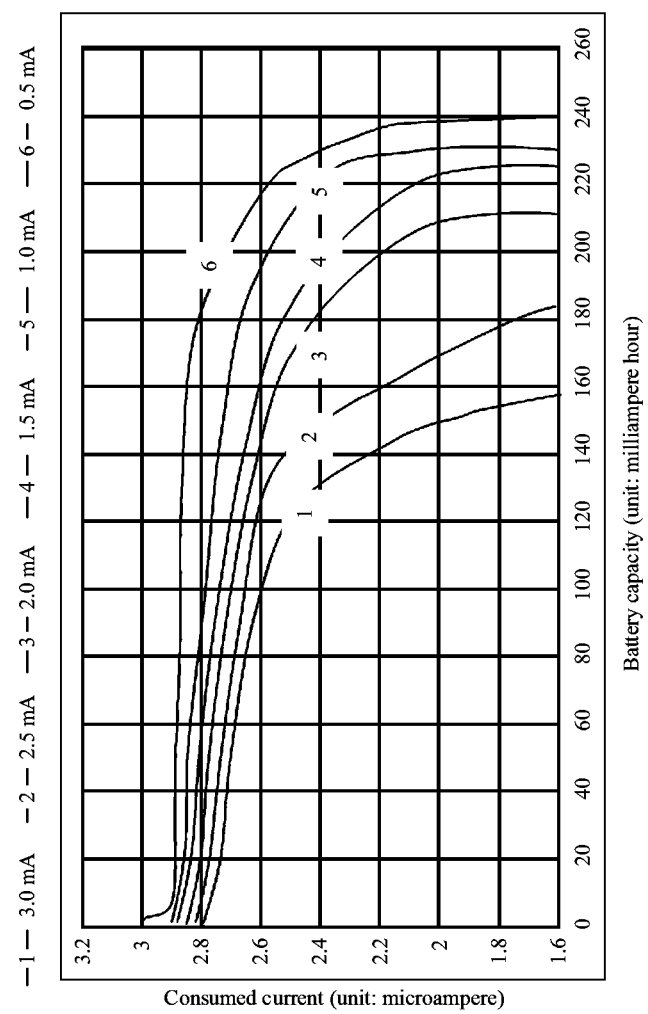
FIG. 2 is a diagram of a relationship between a battery capacity and a consumed current of a communications device.

Because there is a specific distance between the station and the access point, to ensure that the station sends data to the access point within a limited working lifespan, power consumption of the station needs to be reduced. However, in the prior art, when each station sends data to the access point, a transmit power consumed by the station is still relatively high, and in particular, a station that is relatively far away from the access point sends data at a quite high transmit power. Consequently, a current used when the station sends data is relatively high, so that power consumption of the station is relatively high, and power consumption of the station is relatively high. For example, in the scenario shown in FIG. 1, as shown in FIG. 2, a horizontal axis shows battery capacities (unit: milliampere hour), and a vertical axis shows consumed currents (unit: microampere). Assuming that a communications device is an internet of things device, when a current for sending data by the internet of things device is 500 microamperes (uA), a battery capacity of the internet of things device is 230 mAh to 240 mAh (mAh); when a current for sending data by the internet of things device is 2.5 mA, a battery capacity of the internet of things device is 175 mAh. It can be learned that, as an operating current of a battery of the internet of things device increases, an effective capacity of the battery decreases. In an actual application scenario, to expand a transmission range, a transmit power of the internet of things device is increased. Consequently, a battery capacity of the internet of things device is reduced, and a battery lifespan of the internet of things device is shortened, that is, a service lifespan of the internet of things device is shortened.

Figure 3:
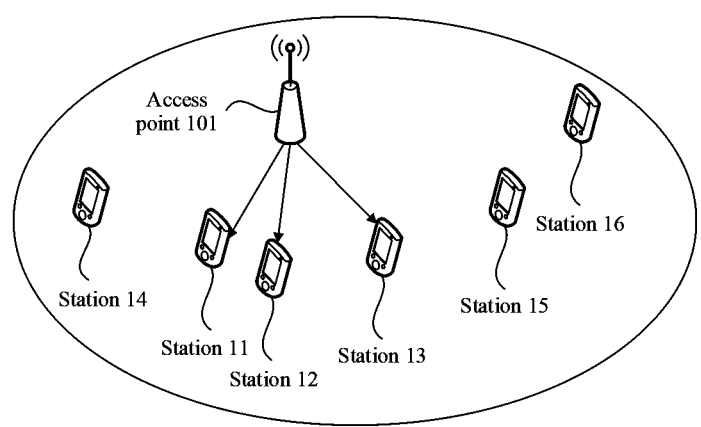
FIG. 3 is a schematic diagram of a scenario according to an embodiment.

FIG. 3 is a schematic diagram of a scenario according to an embodiment. As shown in FIG. 3, this application relates to an access point 101 and a plurality of stations. The stations include a station 11, a station 12, a station 13, a station 14, a station 15, and a station 16. The station 11, the station 12, and the station 13 form a coordination group.

Figure 4:
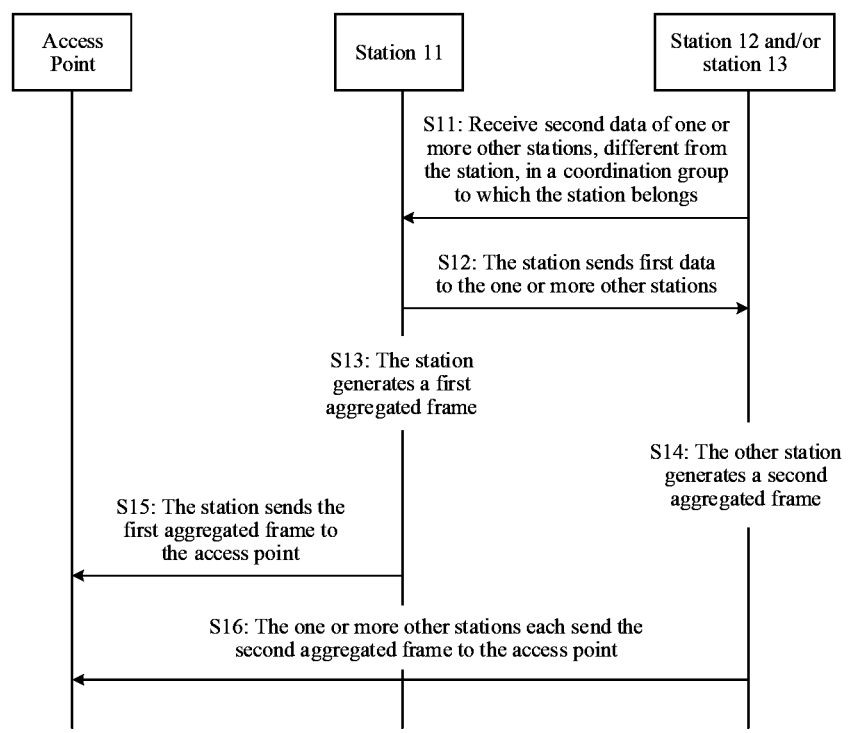
FIG. 4 is a signaling diagram of a data transmission method according to an embodiment.

FIG. 4 is a signaling diagram of a data transmission method according to an embodiment. As shown in FIG. 4, the method includes the following steps.

S11: A station receives second data of one or more other stations, different from the station, in a coordination group to which the station belongs.

For example, there is already at least one coordination group corresponding to the access point, and each of the at least one coordination group includes a plurality of stations.

The station receives the second data sent by the one or more other stations. For example, the other station directly sends the second data to the station, or the other station forwards the second data to the station via another station. When a plurality of other stations each send respective second data to the station, a sequence in which the one or more other stations send the respective second data is not limited. For example, the one or more other stations may send the second data based on a sequence of the stations in the coordination group. Alternatively, the one or more other stations may send the second data in a contention manner. Alternatively, the one or more other stations may send the second data based on a sequence specified by the station. Content of the second data sent by the different other station may be different.

S12: The station sends first data to each of the one or more other stations.

For example, the station sends the first data of the station to the one or more other stations in the coordination group to which the station belongs. These other stations do not include the station that sends the first data.

For example, in the scenario shown in FIG. 3, the station 11, the station 12, and the station 13 belong to a same coordination group. The station 11 sends data of the station 11 to the station 12, and the station 12 sends the data of the station 12 to the station 11.

For another example, in the scenario shown in FIG. 3, the station 11, the station 12, and the station 13 belong to a same coordination group. The station 11 sends the data of the station 11 to the station 12 and the station 13, the station 12 sends the data of the station 12 to the station 11 and the station 13, and the station 13 sends the data of the station 13 to the station 11 and the station 12.

For still another example, in the scenario shown in FIG. 3, the station 11, the station 12, and the station 13 belong to a same coordination group. The station 11 sends data of the station 11 to the station 12, and the station 11 sends the data of the station 11 to the station 13. The station 12 sends data of the station 12 to the station 11, and the station 12 sends the data of the station 12 to the station 13. The station 13 also participates in coordination, but the station 13 has no data to be sent. In this case, the station 13 may transmit a null frame (Null packet), to notify the station 11 and the station 12 that the station 13 participates in coordination, but has no data to be transmitted. In other words, the station 13 sends a null frame to the station 11 and the station 12.

An execution sequence between step S11 and step S12 is not limited.

S13: The station generates a first aggregated frame, where the first aggregated frame includes the first data and the second data.

For example, the station aggregates the first data and the second data to obtain aggregated data, where the aggregated data is referred to as the first aggregated frame. In other words, the station generates the first aggregated frame. For example, the station coalesces a data packet of the first data and a data packet of the second data to obtain a long packet, namely, the first aggregated frame. If any one of the one or more other stations sends a null frame to the station, when the station performs data aggregation, the station does not need to process data of the other station, that is, does not need to process the null frame.

S14: The one or more other stations each generate a second aggregated frame. The second aggregated frame includes the first data and the second data, and an aggregation order of the first data and the second data in the first aggregated frame is the same as an aggregation order of the first data and the second data in the second aggregated frame.

For example, the other station that participates in coordination also aggregate the first data and the second data to obtain aggregated data, and then each of the one or more other stations that participate in coordination generates the second aggregated frame. In addition, when the stations that participate in coordination perform data aggregation, an aggregation order of data is consistent, so that the aggregated frames generated by the different stations are the same.

For example, in the scenario shown in FIG. 3, the station 11 receives data sent by the station 12 and data sent by the station 13, the station 12 receives data sent by the station 11 and the data sent by the station 13, and the station 13 receives the data sent by the station 11 and the data sent by the station 12. The station 11 first aggregates the data of the station 11 with the data sent by the station 13, and then aggregates the data of the station 12 with aggregated data including the data of the station 11 and the data sent by the station 13, to generate an aggregated frame. The station 12 also needs to first aggregate the data of the station 11 and the data of the station 13, and then aggregates the data of the station 12 with aggregated data including the data of the station 11 and the data of the station 13, to generate an aggregated frame. The station 13 also needs to first aggregate the data of the station 11 and the data of the station 3, and then aggregate the data of the station 12 with aggregated data including the data of the station 11 and the data of the station 13, to generate an aggregated frame.

An execution sequence between step S13 and step S14 is not limited.

S15: The station sends the first aggregated frame to the access point.

S16: The one or more other stations each send the second aggregated frame to the access point. A time at which the station sends the first aggregated frame is the same as a time at which the one or more other stations each send the second aggregated frame to the access point. A transmit power at which the station sends the first aggregated frame is less than a power at which the station sends only the first data to the access point, and a transmit power at which the one or more other stations each send the second aggregated frame is less than a power at which the one or more other stations each send only the second data to the access point.

The transmit power of the station is the power at which the station sends only the first data to the access point multiplied by a transmit power coefficient of the station, and for any one of the one or more other stations, a transmit power of the station is the power at which the other station sends only the second data multiplied by a transmit power coefficient of the other station. The transmit power coefficient of the station is greater than 0 and less than 1, the transmit power coefficient of the other station is greater than 0 and less than 1, and a sum of the transmit power coefficient of the station and transmit power coefficients of the one or more other stations is greater than or equal to 1.

For example, the transmit power coefficient of the station is equal to the transmit power coefficient of each of the one or more other stations, and a value of the transmit power coefficient is 1/N. N is a total quantity of the station and the one or more other stations, and N is a positive integer greater than or equal to 2. For example, in the scenario shown in FIG. 3, the station is the STA 11, the one or more other stations are the STA 12 and the STA 13, and a total quantity of stations N is equal to 3.

For example, the station sends the generated first aggregated frame to the access point. In addition, the stations that generate the aggregated frames in the coordination group each send the respective second aggregated frame generated by the stations to the access point. The action of sending the first aggregated frame by the station and the action of sending the second aggregated frame by the other station are simultaneously performed. In other words, step S15 and step S16 are simultaneously performed.

It should be noted that, based on a working principle of a transceiver, "simultaneously" in this embodiment is essential, and sending of the first aggregated frame and sending of the second aggregated frame do not need to be strictly limited to have no time difference, provided that the foregoing processing is basically the same in time dimension. In addition, in the solution of this embodiment of this application, it is beneficial that a plurality of stations simultaneously send aggregated frames to the AP. For example, from a perspective of the station side, this may allow each of the plurality of stations in the coordination group to send an aggregated frame to the access point at a relatively low transmit power, thereby reducing a transmit power of a single station and prolonging a battery lifespan of the single station. From a perspective of the access point side, when the plurality of stations in the coordination group simultaneously send aggregated frames at a relatively low transmit power, the access point can still normally receive data of the stations rather than fail to receive the data of the stations due to a decrease of the transmit power of the single station. Therefore, it is beneficial that the plurality of stations simultaneously send the aggregated frames to the AP.

The time at which the station sends the first aggregated frame is the same as the time at which each of the one or more other stations send the second aggregated frame. The transmit power at which the station sends the first aggregated frame is less than the power at which the station sends only the first data to the access point, and the transmit power at which the other station sends the second aggregated frame is less than the power at which the other station sends only the second data to the access point. In other words, the transmit power of each station that participates in coordination is less than the power at which the station sends data of the station to the access point.

For example, in the scenario shown in FIG. 3, there are three stations in the coordination group. The station 11 generates an aggregated frame, the station 12 generates an aggregated frame, and the station 13 generates an aggregated frame. The station 11, the station 12, and the station 13 simultaneously send aggregated frames generated by the station 11, the station 12, and the station 13 to the access point. In this case, a transmit power at which the station 11 sends the aggregated frames is less than a power at which the station 11 send only data of the station 11 to the access point, a transmit power at which the station 12 sends the aggregated frame is less than a power at which the station 12 sends only data of the station 12 to the access point, and a transmit power at which the station 13 sends the aggregated frame is less than a power at which the station 13 sends only data of the station 13 to the access point.

In addition, the transmit power of the station is the power at which the station sends only the data of the station to the access point multiplied by the transmit power coefficient of the station, and for any one of the one or more other stations, the transmit power of the station is the power P at which the other station sends only the second data multiplied by the transmit power coefficient of the other station. A sum of transmit power coefficients of all stations that participate in coordination is greater than or equal to 1, and a transmit power coefficient of each station that participates in coordination is greater than 0 and less than 1.

In an embodiment, the transmit power of the station may be agreed on by using a protocol, for example, the transmit power coefficient of the station is agreed on.

For example, if the transmit power coefficient of each station that participates in coordination is 1/N, a transmit power of each station that participates in coordination is 1/N times a transmit power at which the station sends data of the station. N is a total quantity of stations that participate in sending of the aggregated frame in the coordination group, and N is a positive integer greater than or equal to 2.

For another example, if the transmit power coefficient of each station that participates in coordination is 1.5/N, a transmit power of each station that participates in coordination is 1.5/N times a transmit power at which the station sends data of the station. N is a quantity of stations that participate in sending of the aggregated frame in the coordination group, and N is a positive integer greater than or equal to 2.

It may be understood that, if all the stations in the coordination group participate in sending of the aggregated frame, a value of N is a quantity of all the stations in the coordination group; and if some stations in the coordination group participate in sending of the aggregated frame, a value of N is a quantity of the stations that send aggregated frames in the coordination group.

For still another example, each station that participates in coordination has a different transmit power coefficient. Alternatively, transmit power coefficients of some stations that participate in coordination are the same, and transmit power coefficients of the other stations are different.

Based on different cases of the foregoing transmit power coefficients, transmit powers of the stations that participate in coordination may be the same or different.

In this embodiment, a station in the coordination group generates an aggregated frame based on the first data of the station and the received second data, where the second data is data of one or more other stations, different from the station, in the coordination group to which the station belongs. Then, stations that generate aggregated frames send respective aggregated frames to the access point at the same time. The one or more stations in the coordination group may separately perform the foregoing process. Data in aggregated frames generated by the stations that participate in coordination is the same, and aggregation orders of the data are also the same, thereby ensuring consistency of the aggregated frames of the different stations. According to the foregoing coordination process, a transmit power at which each station sends an aggregated frame is less than a power at which the station sends only data of the station to the access point, so that a total transmit power of the coordination group can still meet a requirement of normal reception on the access point side. This reduces a transmit power of a single station, effectively reduces a current of the station, and prolongs a service lifespan of the station. For an internet of things device in the internet of things, a total capacity of a battery of the internet of things device may be increased, and a service lifespan of the battery of the internet of things device may be prolonged.

Figure 5:
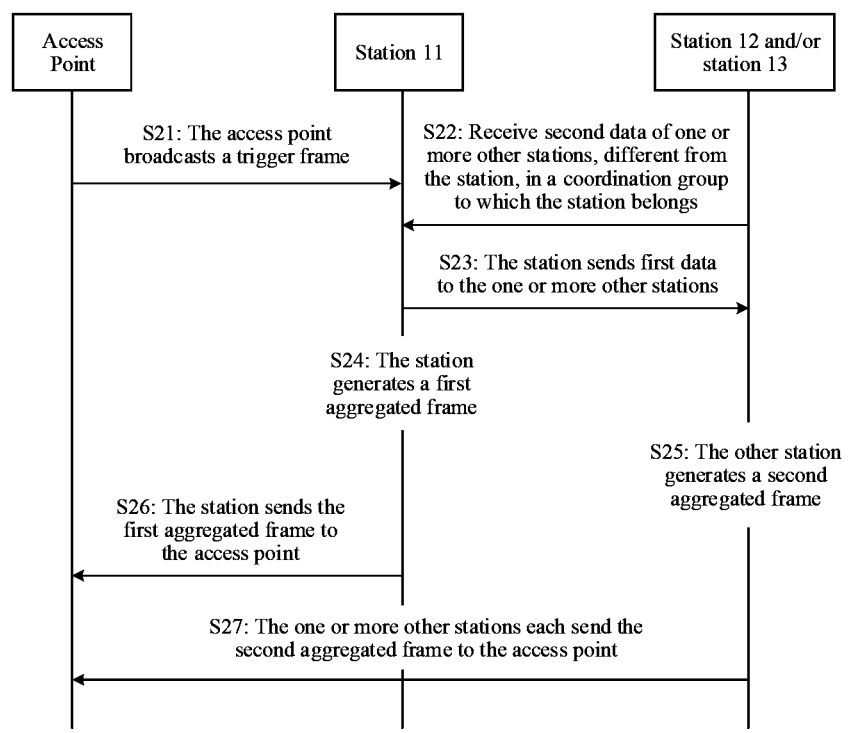
FIG. 5 is a signaling diagram of another data transmission method according to an embodiment.

FIG. 5 is a signaling diagram of another data transmission method according to an embodiment. As shown in FIG. 5, the method includes the following steps.

S21: An access point broadcasts a trigger frame. The trigger frame includes information required by a station for determining a transmit power of the station.

First fields in user information fields that are in the trigger frame and that are corresponding to stations in a coordination group are the same, and the first field is used to indicate a resource unit that carries an aggregated frame. In other words, the first field in the user information field that is in the trigger frame and that is corresponding to the station is the same as the first field in the user information field that is in the trigger frame and that is corresponding to each of one or more other stations. The first field of the station is used to indicate a resource unit that carries a first aggregated frame. The first field of each of the one or more other stations is used to indicate a resource unit that carries a second aggregated frame. The resource unit that carries the first aggregated frame is the same as the resource unit that carries the second aggregated frame. In another embodiment, it may be agreed on a protocol that the first aggregated frame sent by the station may be sent in full bandwidth, and the second aggregated frame sent by each of the one or more other stations may also be sent on full bandwidth. Therefore, a resource indication field in the user information field that is in the trigger frame and that is corresponding to each station that participates in coordination may not be used to indicate the resource unit, but may be reused to indicate a transmit power coefficient of each station.

Second fields in the user information fields that are in the trigger frame and that are corresponding to the stations in the coordination group are the same, and the second field is used to indicate a coding type of the aggregated frame. In other words, the second field in the user information field that is in the trigger frame and that is corresponding to the station is the same as the second field in the user information field that is in the trigger frame and that is corresponding to each of the one or more other stations. The second field of the station is used to indicate a coding type of the first aggregated frame. The second field of each of the one or more other stations is used to indicate a coding type of the second aggregated frame. The coding type of the first aggregated frame is the same as the coding type of the second aggregated frame.

Third fields in the user information fields that are in the trigger frame and that are corresponding to the stations in the coordination group are the same, and the third field is used to indicate a modulation and coding scheme of the aggregated frame. In other words, the third field in the user information field that is in the trigger frame and that is corresponding to the station is the same as the third field in the user information field that is in the trigger frame and that is corresponding to each of the one or more other stations. The third field of the station is used to indicate a modulation and coding scheme of the first aggregated frame. The third field of each of the one or more other stations is used to indicate a modulation and coding scheme of the second aggregated frame. The modulation and coding scheme of the first aggregated frame is the same as the modulation and coding scheme of the second aggregated frame.

Fourth fields in the user information fields that are in the trigger frame and that are corresponding to the stations in the coordination group are the same, and the fourth field is used to indicate dual-carrier modulation of the aggregated frame. In other words, the fourth field in the user information field that is in the trigger frame and that is corresponding to the station is the same as the fourth field in the user information field that is in the trigger frame and that is corresponding to each of the one or more other stations. The fourth field of the station is used to indicate dual-carrier modulation of the first aggregated frame. The fourth field of each of the one or more other stations is used to indicate dual-carrier modulation of the second aggregated frame. The dual-carrier modulation scheme of the first aggregated frame is the same as the dual-carrier modulation scheme of the second aggregated frame.

Fifth fields in the user information fields that are in the trigger frame and that are corresponding to the stations in the coordination group are the same, and the fifth field is used to indicate spatial stream allocation. In other words, the fifth field in the user information field that is in the trigger frame and that is corresponding to the station is the same as the fifth field in the user information field that is in the trigger frame and that is corresponding to each of the one or more other stations. The fifth field of the station is used to indicate spatial stream allocation of the first aggregated frame. The fifth field of each of the one or more other stations is used to indicate spatial stream allocation of the second aggregated frame. The spatial stream allocation mode of the first aggregated frame is the same as the spatial stream allocation mode of the second aggregated frame.

The information that is required for determining the transmit power and that is carried in the trigger frame may be used in the following several implementations, but is not limited thereto:

Implementation 1: The information required for determining the transmit power in the trigger frame indicates that a quantity of stations that send aggregated frames in the coordination group is N or indicates that a transmit power coefficient of a station that sends the aggregated frame in the coordination group is 1/N. In this case, the station may determine, based on the quantity N of the stations or the transmit power coefficient 1/N, that the transmit power of the station is 1/N times the power at which the station sends only first data to the access point. It may be understood that, if all stations in the coordination group participate in sending of the aggregated frame, a value of N is a quantity of all the stations in the coordination group; and if some stations in the coordination group participate in sending of the aggregated frame, a value of N is a quantity of the stations that send aggregated frames in the coordination group. N is a positive integer greater than or equal to 2. It may be understood that, if the trigger frame does not include the user information field corresponding to the station different from the station in the coordination group, but includes only the user information field corresponding to the station in the coordination group, the station may further determine the transmit power coefficient of the station based on a quantity of user information fields in the trigger frame.

Implementation 2: The information required for determining the transmit power in the trigger frame indicates a transmit power coefficient ki of an $i^{th}$ station in N stations that participate in sending of the aggregated frame, where $i \in [2,N]$, i is a positive integer, and a sum of transmit power coefficients of the N stations is greater than or equal to 1. In this case, a transmit power of the $i^{th}$ station is ki times a power at which the $i^{th}$ station in the N stations sends only data to the access point.

Implementation 3: The information required for determining the transmit power in the trigger frame is a target received signal strength indication field included in the user information field corresponding to the station, and the signal strength indication field indicates the transmit power.

Implementation 4: The information required for determining the transmit power in the trigger frame is a resource allocation field and the target received signal strength indication field that are in the trigger frame and that are corresponding to the station. The resource allocation field corresponding to the station indicates the transmit power coefficient of the station, and the target received signal strength indication field corresponding to the station is used by the station to determine the power at which the station sends only the first data. It may be understood that, when the resource unit allocation field of each station is not used to carry the transmit power coefficient, but another field is used to carry the transmit power coefficient of each station that participates in coordination, the resource unit allocation field of each station that participates in coordination may be used to indicate the resource unit for each station.

For example, after the station generates the aggregated frame, the station needs to be indicated to send the aggregated frame together with the other station. The access point may broadcast the trigger frame (trigger), so that the stations in the coordination group can receive the trigger frame. The trigger frame is used to indicate the stations to send data after a preset time. For example, in the scenario shown in FIG. 3, the access point broadcasts the trigger frame, and the station 11, the station 12, and the station 13 that participate in coordination all receive the trigger frame. The station 11, the station 12, and the station 13 all send respective aggregated frames at a short interframe space (short interframe space, SIFS) time after the trigger frame ends. In this way, the stations that participate in coordination simultaneously send the aggregated frames based on an instruction of the access point. This ensures data synchronization.

Figure 6:
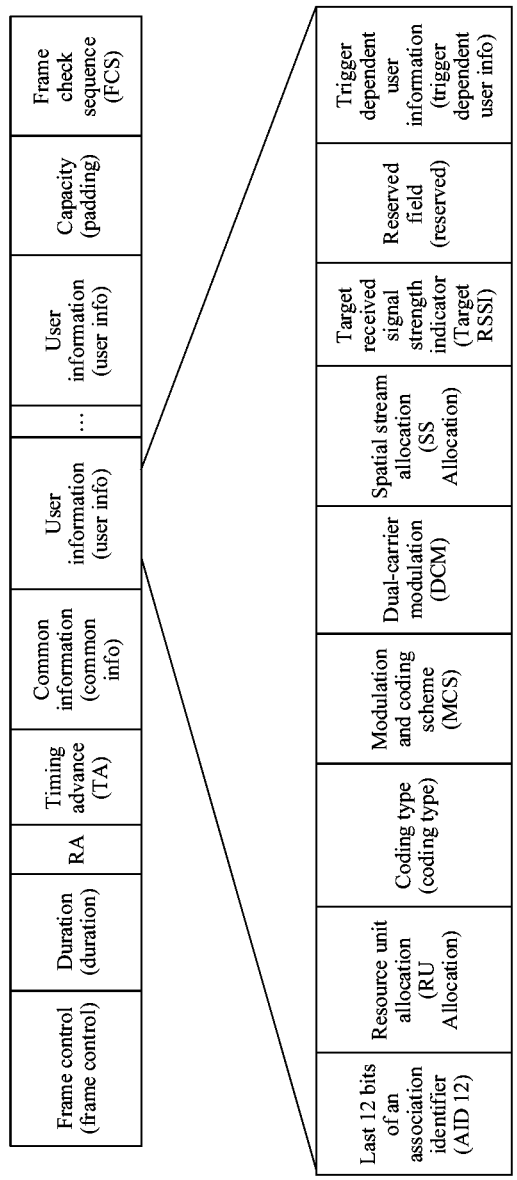
FIG. 6 is a schematic diagram of a frame structure of a trigger frame according to an embodiment.

FIG. 6 is a schematic diagram of a frame structure of a trigger frame according to an embodiment. As shown in FIG. 6, the trigger frame includes a frame control field, a duration field, an RA field, a timing advance (TA) field, a common information (common info) field, a capacity (padding) field, and a frame check sequence (FCS) field. The trigger frame further includes M user information (user info) fields, and M is a positive integer greater than or equal to 2. N user information fields in the M user information fields correspond one-to-one to N stations that participate in coordination in the coordination group, and the user information field corresponding to the station is used to carry parameter settings of the station corresponding to the user information field. Each of the N user information fields includes the last 12 bits of an association identifier (AID), a first field, a second field, a third field, a fourth field, a fifth field, a target received signal strength indicator (Target RSSI) field, a reserved field, a trigger dependent user information (trigger dependent user info) field, and the like. The last 12 bits of the AID in the user information field are the last 12 bits of the AID of the station corresponding to the user information field.

In addition, first fields in the user information fields that are in the trigger frame and that are corresponding to the stations in the coordination group are the same, and the first field is used to indicate a resource unit that carries the aggregated frame. In an embodiment, the first field is a resource unit allocation (RU Allocation) field. Second fields in the user information fields that are in the trigger frame and that are corresponding to the stations in the coordination group are the same, and the second field is used to indicate a coding type of the aggregated frame. In an embodiment, the second field is a coding type field. Third fields in the user information fields that are in the trigger frame and that are corresponding to the stations in the coordination group are the same, and the third field is used to indicate a modulation and coding scheme of the aggregated frame. In an embodiment, the third field is a modulation and coding scheme (MCS) field. Fourth fields in the user information fields that are in the trigger frame and that are corresponding to the stations in the coordination group are the same, and the fourth field is used to indicate dual-carrier modulation of the aggregated frame. In an embodiment, the fourth field is a dual carrier modulation (DCM) field. Fifth fields in the user information fields that are in the trigger frame and that are corresponding to the stations in the coordination group are the same, and the fifth field is used to indicate spatial stream allocation of the aggregated frame. In an embodiment, the fifth field is a spatial stream allocation (SS Allocation) field.

Because the first fields, the second fields, the third fields, the fourth fields, and the fifth fields in the user information fields corresponding to the stations in the coordination group each are the same, it is ensured that when sending the aggregated frames, the stations that participate in coordination may use a same resource unit, same modulation and coding scheme (MCS), same channel, and the like. In other words, it is ensured that when sending the aggregated frames, the stations that participate in coordination may send the aggregated frames on a same resource unit in a same manner, so that power superposition is implemented for a plurality of aggregated frames received by the access point, and it is ensured that a decrease in a transmit power of a single station does not affect receiving of data of each station by the access point.

For example, a user information field 1 in the trigger frame corresponds to the STA 11, a user information field 2 in the trigger frame corresponds to the STA 12, and a user information field 3 in the trigger frame corresponds to the STA 13. An RU allocation field in the user information field 1 is the same as each of an RU allocation field in the user information field 2 and an RU allocation field in the user information field 3. A coding type field in the user information field 1 is the same as each of a coding type field in the user information field 2 and a coding type field in the user information field 3. An MCS field in the user information field 1 is the same as each of an MCS field in the user information field 2 and an MCS field in the user information field 3. A DCM field in the user information field 1 is the same as each of a DCM field in the user information field 2 and a DCM field in the user information field 3. An SS allocation field in the user information field 1 is the same as each of an SS allocation field in the user information field 2 and an SS allocation field in the user information field 3.

The trigger frame further includes the information required by each of the stations for determining the transmit power for sending the aggregated frame. Three implementations are provided herein.

Implementation 1: The trigger frame indicates that the transmit power is 1/N times a power at which the station sends only data of the station to the access point. It may be understood that, if all stations in the coordination group participate in sending of the aggregated frame, a value of N is a quantity of all the stations in the coordination group; and if some stations in the coordination group participate in sending of the aggregated frame, a value of N is a quantity of the stations that send aggregated frames in the coordination group. N is a positive integer greater than or equal to 2. Therefore, the transmit power at which the station sends the aggregated frame to the access point is P/N, and P is the power at which the station sends only the first data of the station to the access point. It should be noted that, it may not be indicated by the trigger frame, but is pre-specified that the transmit power is 1/N times the power at which the station sends the data of the station to the access point.

For example, in the scenario shown in FIG. 3, the station 11, the station 12, and the station 13 participate in the foregoing coordination. $P_1$ is a power at which the station 11 sends only data of the station 11 to the access point, and $P_2$ is a power at which the station 12 sends only data of the station 12 to the access point, and $P_3$ is a power at which the station 13 sends only data of the station 13 to the access point. After the station 11 and the station 12 participate in the coordination process in this application, a transmit power at which the station 11 sends the aggregated frame to the access point is $P_1/3$, a transmit power at which the station 12 sends the aggregated frame to the access point is $P_2/3$, and a transmit power at which the station 13 sends the aggregated frame to the access point is $P_3/3$.

Implementation 2: The trigger frame indicates a transmit power coefficient ki of an $i^{th}$ station in the coordination group, where i is a positive integer, and a sum of transmit power coefficients of all the stations is greater than or equal to 1. Therefore, the transmit power at which the station sends the aggregated frame to the access point is ki*P, and P is the power at which the station sends only the first data of the station to the access point. When a sum of the transmit power coefficients of all the stations is equal to 1, a signal-to-noise ratio (SNR) existing when a single station sends an aggregated frame can be ensured. When a sum of the transmit power coefficients of all the stations is greater than 1, receiving energy of the access point may be increased, thereby improving robustness of data receiving and extending a communication distance.

Implementation 3: The target RSSI field in the user information field in the trigger frame indicates a transmit power of a station corresponding to the user information field. For example, the target RSSI field in the user information field corresponding to the station indicates that the transmit power of the station is P/N, and P is the power at which the station sends only the first data of the station to the access point. Alternatively, the target RSSI field in the user information field corresponding to the station indicates the transmit power coefficient ki of the station, and the transmit power of the station is ki*P, where P is the power at which the station sends only the first data of the station to the access point. In this case, a sum of the transmit power coefficients of all the stations is greater than or equal to 1. Alternatively, the target RSSI field of each station in the trigger frame indicates the transmit power at which the station sends the aggregated frame.

Implementation 4: The RU allocation field corresponding to the station in the user information field in the trigger frame indicates a transmit power coefficient of the station, and the target RSSI field is used by the station to determine the power at which the station sends only the first data. Then, the station may determine, based on the target RSSI field, the power P at which the station sends the first data, and then the station multiplies P by the transmit power coefficient ki of the station indicated by the RU allocation field, to obtain the transmit power at which the station sends the aggregated frame.

For example, a UL target RSSI field in the user info field in the trigger frame is modified to a transmit power coefficient field, so that an actual transmit power at which the station sends the aggregated frame is equal to the transmit power at which the station sends only the first data multiplied by the power transmit coefficient. Alternatively, in another embodiment, the RU Allocation field in each user information field may carry a transmit power coefficient of each station that participates in coordination. In actual implementation, the station may first calculate an original transmit power based on the UL target RSSI field, and then calculate, based on the transmit power coefficient indicated by the RU Allocation field, the actual transmit power at which the station sends the aggregated frame. The actual transmit power is equal to the original transmit power multiplied by the power transmit coefficient.

Three cases: no station participates in coordination (a case in the prior art), two stations participate in coordination, and three stations participate in coordination are analyzed. Assuming that a transmit power required by a single station to communicate with the access point is 9 decibel millivatt (dBm), and a transmit power used for interaction between stations is 1-2 dBm, power consumption comparison shown in Table 1 may be obtained. In Table 1, U represents a voltage, I represents a current, and t represents time. In addition, for ease of description, c=U*t. It is assumed that a transmit power is twice a receive power, and a current for sending data during interaction between stations is 0.5 mA. In this case, during interaction between the stations, transmit energy consumption is U*0.5*t, and receive energy consumption is U*0.5*0.5.

TABLE 1

Power consumption comparison

|  | No station participates in coordination | Two stations participate in coordination | Three stations participate in coordination |
|---|---|---|---|
| Transmit current | 3 milliamperes (9 dBm) | 1.5 milliamperes (6 dBm) | 1 milliampere (4 dBm) |
| Battery capacity | 100 milliampere hours | 185 milliampere hours | 205 milliampere hours |
| Consumption of communication with the access point (U * I * t) | U * 3 * t | U * (3/2) * 2t | U * (3/3) * 3t |
| Consumption of interaction between stations (U * I * t) | 0 | U * 0.5 * t * (1 + 0.5) | U * 0.5 * t * (1 + 2 * 0.5) |
| Percentage of consumption of a single transmission to the battery capacity | 3.00 c % | 1.97 c % | 1.93 c % |
|  | 1 | 65% | 64% |

In Table 1, when two stations participate in coordination, 65% may be obtained by dividing 1.97c % by 3.00c %. When three stations participate in coordination, 64% is obtained by dividing 1.93c % by 3.00c %. It can be learned from the analysis in Table 1 that after the stations in the coordination group participate in coordination, battery consumption of the stations is reduced, and power consumption of the stations is reduced.

It may be understood that S21 needs to be performed only before step S26. For example, step S21 may alternatively be performed after step S23.

S22: The station receives second data of one or more other stations, different from the station, in the coordination group to which the station belongs.

For example, for this step, reference may be made to step S11 in FIG. 4.

S23: The station sends the first data to each of the one or more other stations.

For example, for this step, reference may be made to step S12 in FIG. 4.

S24: The station generates the first aggregated frame, where the first aggregated frame includes the first data and the second data.

An aggregation relationship of the data in the aggregated frame may be indicated in the following several implementations, but is not limited thereto:

Implementation 1: An aggregation order of the first data and the second data in the aggregated frame corresponds to an order in the user information field in the trigger frame.

Implementation 2: An aggregation order of the first data and the second data in the aggregated frame corresponds to an order relationship between the stations in the coordination group.

Implementation 3: An aggregation order of the first data and the second data in the aggregated frame corresponds to a time sequence relationship between sending of the first data by the station and sending of the second data by the one or more other stations.

For example, when generating the aggregated frame, the station aggregates the first data and the second data based on a specific order relationship. The station may generate the aggregated frame in the following several implementations:

Implementation 1: An aggregation order corresponds to an order in the user information field in the trigger frame broadcast by the access point. In this case, the station sequentially aggregates the first data and the second data based on a sequence in the user information field in the trigger frame sent by the access point, to obtain the aggregated frame.

For example, in the scenario shown in FIG. 3, the user information fields in the trigger frame correspond one-to-one to the stations. A user information field 1 corresponds to the station 11, a user information field 2 corresponds to the station 13, and a user information field 3 corresponds to the station 12. The station 1 may aggregate data of the station 11 and data of the station 13, and then aggregate data of the station 12 with aggregated data including the data of the station 11 and the data of the station 13. The station 12 may aggregate the data of the station 11 and the data of the station 13, and then aggregate the data of the station 12 with aggregated data including the data of the station 11 and the data of the station 13. Similarly, the station 13 may aggregate the data of the station 11 and the data of the station 13, and then aggregate the data of the station 12 with aggregated data including the data of the station 11 and the data of the station 13.

Implementation 2: An aggregation order corresponds to an order relationship between the stations in the coordination group. In this case, the station sequentially aggregates the first data and the second data based on the order relationship between the stations in the coordination group, to obtain the aggregated frame.

For example, in the scenario shown in FIG. 3, an order relationship between the stations in the coordination group is as follows: the station 13, the station 11, and the station 12. Then, each station aggregates data of the station 11 and data of the station 13, and then aggregates data of the station 12 with aggregated data including the data of the station 11 and the data of the station 13.

Implementation 3: An aggregation order corresponds to a time sequence relationship of sending data by the stations. In this case, the stations sequentially aggregate the first data and the second data based on the time sequence relationship of sending data by the stations that participate in coordination, to obtain aggregated frames.

For example, in the scenario shown in FIG. 3, the station 11 first sends data of the station 11, the station 13 then sends data of the station 13, and the station 12 finally sends data of the station 12. Then, the station 11 sequentially receives the data of the station 13 and the data of the station 12. The station 12 sequentially receives the data of the station 11 and the data of the station 13. The station 13 sequentially receives the data of the station 11 and the data of the station 12. Each station learns that a sequence of data sending is the station 11, the station 13, and the station 12. In this case, each station first aggregates the data of the station 11 and the data of the station 13, and then aggregates the data of the station 12 with aggregated data including the data of the station 11 and the data of the station 13.

The stations that participate in coordination have a same data aggregation order. For another process, refer to step S111 in FIG. 4. Details are not described herein again.

S25: The other station generates a second aggregated frame. The second aggregated frame includes the first data and the second data, and an aggregation order of the first data and the second data in the first aggregated frame is the same as an aggregation order of the first data and the second data in the second aggregated frame.

For example, for a process in which the other station generates the aggregated frames, refer to step S24.

S26: The station sends the first aggregated frame to the access point.

S27: The one or more other stations each send the second aggregated frame to the access point. A time at which the station sends the first aggregated frame is the same as a time at which the one or more other stations each send the second aggregated frame. A transmit power at which the station sends the first aggregated frame is less than a power at which the station sends only the first data to the access point, and a transmit power at which the one or more other stations each send the second aggregated frame is less than a power at which the one or more other stations each send only the second data to the access point.

For example, for descriptions of the transmit power in steps S26 and S27, refer to step S21. In this embodiment, the access point may broadcast the trigger frame to the stations in the coordination group, where the trigger frame includes the information required by each of the stations for determining the transmit power. The access point may determine, based on the trigger frame, the transmit power for sending the aggregated frame, and the transmit power is less than the power at which the station sends only the data of the station to the access point. In this way, a total transmit power of the coordination group can always meet a requirement of normal reception on the access point side. Therefore, the access point may indicate the transmit power at which the station in the coordination group sends the aggregated frame, to ensure that the transmit power is less than the power at which the station sends only the first data to the access point. This reduces a transmit power of a single station, effectively reduces a current of the station, and prolongs a service lifespan of the station. In addition, a plurality of manners are provided to indicate an order relationship of the data in the aggregated frame, to ensure consistency of aggregation orders of aggregated frames.

Figure 7:
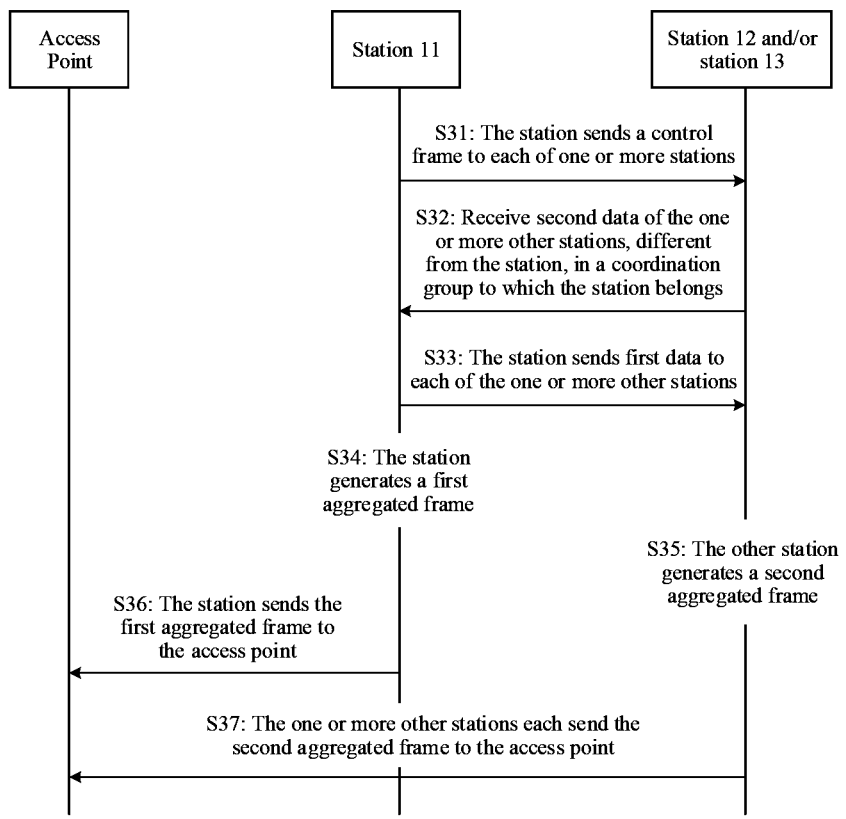
FIG. 7 is a signaling diagram of still another data transmission method according to an embodiment.

FIG. 7 is a signaling diagram of still another data transmission method according to an embodiment of this application. As shown in FIG. 7, the method includes the following steps.

S31: A station sends a control frame to each of one or more other stations, where the control frame includes information required by the other station for determining a transmit power.

The control frame includes one common information field and N–1 user information fields. It may be understood that, if all stations in a coordination group participate in sending of an aggregated frame, a value of N is a quantity of all the stations in the coordination group; and if some stations in the coordination group participate in sending of the aggregated frame, a value of N is a quantity of the stations that send aggregated frames in the coordination group. In other words, N is a total quantity of the station and the one or more other stations that participate in coordination. N is a positive integer greater than or equal to 2. N−1 is a quantity of the one or more other stations that participate in coordination. The N−1 user information fields correspond one-to-one to the one or more other stations that participate in coordination. The common information field includes a first field, a second field, a third field, a fourth field, and a fifth field. The first field is used to indicate a resource unit that carries the aggregated frame, the second field is used to indicate a coding type of the aggregated frame, the third field is used to indicate a modulation and coding scheme of the aggregated frame, the fourth field is used to indicate dual-carrier modulation of the aggregated frame, and the fifth field is used to indicate spatial stream allocation.

The control frame includes the information required by the station for determining the transmit power, and the information may be used in the following several implementations, but is not limited thereto:

Implementation 1: If the information required for determining the transmit power in the control frame indicates that a quantity of stations that participate in coordination in the coordination group is N or indicates that a transmit power coefficient of a station that participates in coordination in the coordination group is 1/N, the station may determine, based on the quantity N of stations or the transmit power coefficient 1/N, that the transmit power of the station is 1/N times a power at which the station sends only first data to the access point.

Implementation 2: The information required for determining the transmit power in the control frame indicates a transmit power coefficient ki of an $i^{th}$ station in the N stations, where i∈[2,N], i is a positive integer, and a sum of transmit power coefficients of the N stations is greater than or equal to 1. In this case, a transmit power of the $i^{th}$ station is ki times a power at which the station sends only the first data to the access point. For example, the transmit power coefficients of the N stations may be included in user information fields corresponding to the N stations.

For example, after the station generates the aggregated frame, the station needs to be indicated to send the aggregated frame together with the other station. Any one of the one or more other stations in the coordination group may send a control frame to the stations that participate in cooperation, so that the stations that participate in coordination in the coordination group may receive the control frame. The control frame includes the information required by each of the stations for determining the transmit power. In addition, the other station that sends the control frame may be a station that participates in coordination or not. Alternatively, the station sends a control frame to the other station that participates in coordination, where the control frame includes the information required by the other station for determining the transmit power. It should be noted that, when a station that does not participate in coordination sends a control frame, the control frame includes information used by all stations that participate in coordination to determine transmit powers. When a station that participates in coordination sends a control frame, the control frame may include a transmit power coefficient of the other station that participates in coordination, and may not include a transmit power coefficient of the station that sends the control frame. The control frame may also be referred to as a synchronization frame, a trigger frame, or the like.

Figure 8:
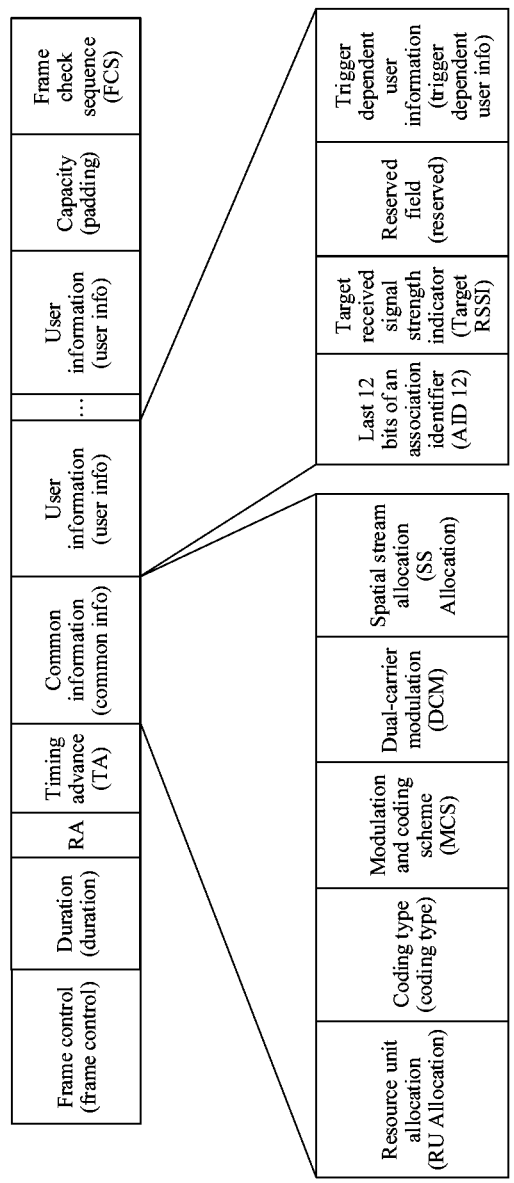
FIG. 8 is a schematic diagram of a frame structure of a control frame according to an embodiment.

FIG. 8 is a schematic diagram of a frame structure of a control frame according to an embodiment. As shown in FIG. 8, the control frame includes one common information field and N−1 user information fields. The N−1 user information fields correspond one-to-one to N−1 other stations, different from the station that sends the control frame, in the N stations that participate in coordination in the coordination group. In addition, the control frame may further include a frame control field, a duration field, an RA field, a TA field, a padding field, and an FCS field. The user information fields, namely, user information fields of stations that do not send the control frame in the control frame, in the control frame correspond one-to-one to the N−1 other stations. In addition, each of the N−1 user information fields includes the last 12 bits of an AID. The last 12 bits of the AID in the user information field are the last 12 bits of the AID of the station corresponding to the user information field. In addition, each user information field further includes a target RSSI field, a reserved field, and a trigger dependent user info field. The common information field includes a first field, a second field, a third field, a fourth field, and a fifth field. The first field is used to indicate a resource unit that carries the aggregated frame. In an embodiment, the first field is an RU allocation field. The second field is used to indicate a coding type of the aggregated frame. In an embodiment, the second field is a coding type field. The third field is used to indicate a modulation and coding scheme of the aggregated frame. In an embodiment, the third field is an MCS field. The fourth field is used to indicate dual-carrier modulation of the aggregated frame. In an embodiment, the fourth field is a DCM field. The fifth field is used to indicate spatial stream allocation of the aggregated frame. In an embodiment, the fifth field is an SS allocation field. All stations that participate in coordination each have corresponding first field, second field, third field, fourth field, and fifth field in the common information field. The first field, the second field, the third field, the fourth field, and the fifth field are carried in the common information field rather than are separately and repeatedly carried in the N−1 user information fields. This can avoid repeated sending of the field, reduce signaling overheads, and save network resources.

The control frame further includes the information required by the station for determining the transmit power for sending the aggregated frame. Two implementations are provided herein.

Implementation 1: The control frame indicates that the transmit power is 1/N times a power at which the station sends only data of the station to the access point, where N is a quantity of stations that participate in coordination in the coordination group, namely, a quantity of stations that send aggregated frames to the access point, and N is a positive integer greater than or equal to 2. Therefore, the transmit power at which the station sends the aggregated frame to the access point is P/N, and P is the power at which the station sends only the first data of the station to the access point. It should be noted that, it may not be indicated by the control frame, but is pre-specified in a protocol that the transmit power is 1/N times the power at which the station sends the data of the station to the access point.

Implementation 2: The control frame indicates a transmit power coefficient ki of an $i^{th}$ station in the coordination group, where i∈[2,N], i is a positive integer, and a sum of transmit power coefficients of all the stations is greater than or equal to 1. Therefore, the transmit power at which the station sends the aggregated frame to the access point is ki*P, and P is the power at which the station sends only the first data of the station to the access point. When a sum of the transmit power coefficients of all the stations is equal to 1, a signal-to-noise ratio (SNR) existing when a single station sends an aggregated frame can be ensured. When a sum of the transmit power coefficients of all the stations is greater than 1, receiving energy of the access point may be increased, thereby improving robustness of data receiving and extending a communication distance.

S31 needs to be performed only before steps S36 and S37. For example, step S31 may alternatively be performed after step S33.

S32: The station receives the second data of the one or more other stations, different from the station, in the coordination group to which the station belongs.

For example, for this step, reference may be made to step S11 in FIG. 4.

S33: The station sends the first data to each of the one or more other stations.

For example, for this step, reference may be made to step S12 in FIG. 4.

S34: The station generates a first aggregated frame, where the first aggregated frame includes the first data and the second data.

An aggregation relationship of the data in the aggregated frame may be indicated in the following several implementations:

Implementation 1: An aggregation order of the first data and the second data in the aggregated frame corresponds to an order in the user information field in the control frame.

Implementation 2: An aggregation order of the first data and the second data in the aggregated frame corresponds to an order relationship between the stations in the coordination group.

Implementation 3: An aggregation order of the first data and the second data in the aggregated frame corresponds to a time sequence relationship between sending of the first data by the station and sending of the second data by the one or more other stations.

For example, when generating the aggregated frame, the station aggregates the first data and the second data based on a specific order relationship. The station may generate the aggregated frame in the following several implementations:

Implementation 1: An order relationship of the data in the aggregated frame corresponds to an order in the user information field in the control frame sent by the station. In this case, the station sequentially aggregates the first data and the second data based on an order in the user information field in the control frame, to obtain the aggregated frame. Because the control frame does not have a user information field of the station that sends the control frame, a data aggregation order of the station that sends the control frame may be set fixedly in advance. For example, the data of the station that sends the control frame is first aggregated, or the data of the station that sends the control frame is finally aggregated.

For example, it is agreed that the data of the station that sends the control frame is finally aggregated. In the scenario shown in FIG. 3, the station 11 sends a control frame to the stations 12 and 13 that participate in coordination. The control frame includes a user information field 1 and a user information field 2, where the user information field 1 corresponds to the station 12, and the user information field 2 corresponds to the station 13. The station 11 may aggregate data of the station 12 and data of the station 13, and then aggregate data of the station 11 with aggregated data including the data of the station 12 and the data of the station 13. Similarly, the station 12 aggregates the data of the station 12 and the data of the station 13, and then aggregates the data of the station 11 with aggregated data including the data of the station 12 and the data of the station 13. The station 13 aggregates the data of the station 12 and the data of the station 13, and then aggregates the data of the station 11 with aggregated data including the data of the station 12 and the data of the station 13.

Implementation 2: An order relationship of the data in the aggregated frame corresponds to an order relationship between the stations in the coordination group. In this case, the station sequentially aggregates the first data and the second data based on the order relationship between the stations in the coordination group, to obtain the aggregated frame.

Implementation 3: An aggregation order corresponds to a time sequence relationship of sending data by the stations. In this case, the stations sequentially aggregate the first data and the second data based on the time sequence relationship of sending data by the stations that participate in coordination, to obtain aggregated frames.

In addition, the stations that participate in coordination have a same data aggregation order. For another process, refer to step S101 in FIG. 4. Details are not described herein again.

S35: The other station generates a second aggregated frame. The second aggregated frame includes the first data and the second data, and an aggregation order of the first data and the second data in the first aggregated frame is the same as an aggregation order of the first data and the second data in the second aggregated frame.

For example, for a process in which the other station generates the aggregated frames, refer to step S34.

S36: The station sends the first aggregated frame to the access point.

S37: The one or more other stations each send the second aggregated frame to the access point. A time at which the station sends the first aggregated frame is the same as a time at which the one or more other stations each send the second aggregated frame. A transmit power at which the station sends the first aggregated frame is less than a power at which the station sends only the first data to the access point, and a transmit power at which the one or more other stations each send the second aggregated frame is less than a power at which the one or more other stations each send only the second data to the access point.

For example, for descriptions of the transmit power in steps S36 and S37, refer to step S31.

In this embodiment, the station may send the control frame to the other station that participates in coordination in the coordination group, or any one of the one or more other stations sends a control frame to the stations. The control frame includes the information required by each of the stations for determining the transmit power. The access point may determine, based on the control frame, the transmit power for sending the aggregated frame, and the transmit power is less than the power at which the station sends only the first data to the access point. In this way, a total transmit power of the coordination group can always meet a requirement of normal reception on the access point side. Therefore, the access point may indicate the transmit power at which the station in the coordination group sends the aggregated frame, to ensure that the transmit power is less than the power at which the station sends only the first data to the access point. This reduces a transmit power of a single station, effectively reduces a current of the station, and prolongs a service lifespan of the station. In addition, a plurality of manners are provided to indicate an order relationship of the data in the aggregated frame, to ensure consistency of aggregation orders of aggregated frames.

Figure 9:
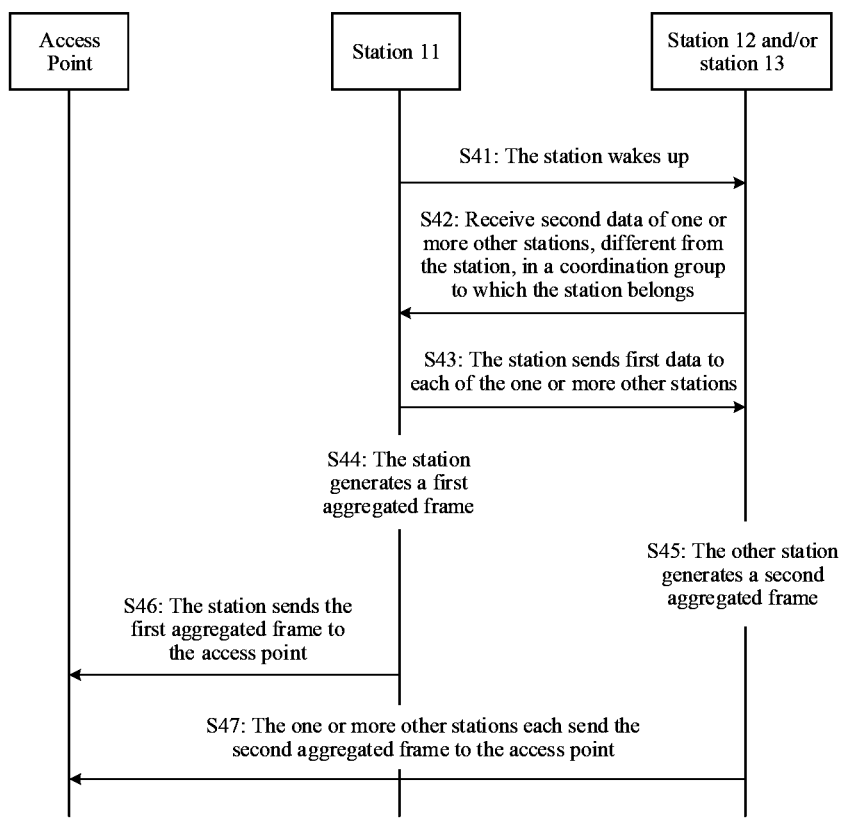
FIG. 9 is a signaling diagram of still yet another data transmission method according to an embodiment.

FIG. 9 is a signaling diagram of still yet another data transmission method according to an embodiment. As shown in FIG. 9, the method includes the following steps.

S41: A station wakes up.

There are the following several implementations of step S41:

Implementation 1 of step S41: The station receives group target wake time information broadcast by an access point, where the group target wake time information is used to indicate stations in the coordination group to wake up. Then, the station wakes up based on the group target wake time information.

Implementation 2 of step S41: The station receives an association identifier that is corresponding to the coordination group and that is sent by the access point, and receives a management frame broadcast by the access point. A bit that is in the management frame and that is corresponding to the association identifier is 1, representing waking up the stations in the coordination group. Then, the station wakes up based on the management frame.

Implementation 3 of step S41: The station negotiates with one or more other stations that participate in coordination for the group target wake time information. The group target wake time information indicates that the stations in the coordination group are to wake up at a preset time. The station wakes up based on the group target wake time information. Then, the station sends the group target wake time information to the access point.

For example, before the stations in the coordination group perform coordination, the stations that participate in coordination are not in an awake state at the same time. In view of this, a power save mechanism needs to be provided for these stations. Before the station receives data and sends data, the station needs to wake up. This application provides the following several implementations to wake up the station.

Implementation 1: The access point schedules, in a grouping manner, the stations to wake up. Specifically, the access point establishes one piece of group target wake time (Groupcast TWT) information. The access point broadcasts the Groupcast TWT information, where the Groupcast TWT information is used to indicate the stations in the coordination group to wake up. The station may receive the Groupcast TWT information, and then the station wakes up based on the Groupcast TWT information. In this case, the stations that receive the Groupcast TWT information wake up at the same time based on the Groupcast TWT information.

Implementation 2: The access point schedules, in a grouping manner, the stations to wake up at the same time. Specifically, the access point allocates an AID corresponding to the coordination group, and sends the AID corresponding to the coordination group to each station in the coordination group. The access point configures a management frame, where the management frame has a bit corresponding to the AID, and the bit is set to 1, indicating waking up the stations in the coordination group. The management frame may be a traffic indication map (TIM), and the access point broadcasts the management frame. Therefore, the station receives the AID corresponding to the coordination group, receives the management frame, and wakes up based on the management frame. In this case, the stations in the coordination group wake up at the same time based on the AID and the management frame corresponding to the coordination group.

Implementation 3: The stations that participate in coordination in the coordination group negotiate one piece of target wake time (TWT) information, and the TWT information indicates that the stations in the coordination group are to wake up at a preset time. After the stations that participate in coordination negotiate the TWT information, the stations may wake up based on the negotiated TWT information. Then, the station sends the negotiated TWT information to the access point.

S42: The station receives second data of the one or more other stations, different from the station, in the coordination group to which the station belongs.

S43: The station sends first data to each of the one or more other stations.

S44: The station generates a first aggregated frame, where the first aggregated frame includes the first data and the second data.

S45: The one or more other stations each generate a second aggregated frame. The second aggregated frame includes the first data and the second data, and an aggregation order of the first data and the second data in the first aggregated frame is the same as an aggregation order of the first data and the second data in the second aggregated frame.

S46: The station sends the first aggregated frame to the access point.

S47: The one or more other stations each send the second aggregated frame to the access point. A time at which the station sends the first aggregated frame is the same as a time at which the one or more other stations each send the second aggregated frame. A transmit power at which the station sends the first aggregated frame is less than a power at which the station sends only the first data to the access point, and a transmit power at which the one or more other stations each send the second aggregated frame is less than a power at which the one or more other stations each send only the second data to the access point.

For example, for the foregoing steps S42 to S47, refer to the steps in FIG. 4, the steps in FIG. 5, or the steps in FIG. 7.

In step S46 and step S47, each station that participates in coordination simultaneously sends the aggregated frame generated by each station to the access point in a space-time block coding (space-time block coding, STBC) scheme.

For example, based on FIG. 4 to FIG. 7, in this step, the station may send the aggregated frame in the STBC scheme. When the station sends the aggregated frame in the STBC scheme, each station is equivalent to an antenna.

For example, when two stations participate in coordination, a coding matrix of the two stations is set to be $$\begin{bmatrix} c_1 & c_2 \\ -c_2^* & c_1^* \end{bmatrix},$$

where $c_1$ and $c_2$ represent two pieces of data. The coding matrix indicates that after an aggregated frame is coded, data represented by every two symbols is to be sent by two stations in two slots in a form of a coding matrix. For example, for data $a_1$ and $a_2$, the station 1 and the station 2 send data $a_1$ and data $-a^*_2$ to the access point in a first slot, and send data $a_2$ and data $a^*_1$ to the access point in a second slot. For data $b_1$ and $b_2$, the station 1 and the station 2 send data $b_1$ and data $-b^*_2$ to the access point in the third slot, and send data $b_2$ and data $b^*_1$ to the access point in a fourth slot. For subsequent data that needs to be sent, the data is still sent in a manner in which two pieces of data constitute one coding matrix.

In this embodiment, the station wakes up based on an instruction of the access point, or the stations wake up under negotiation, to ensure that the stations in the coordination group are in a wake-up state at the same time before coordination. Then, the station generates the aggregated frame, and sends the aggregated frame to the access point in an STBC scheme. Because the STBC data sending scheme can provide a better diversity gain, after the aggregated frame is sent in the STBC scheme, reception performance of the access point can be improved, and a packet error rate can be reduced.

Figure 10A:
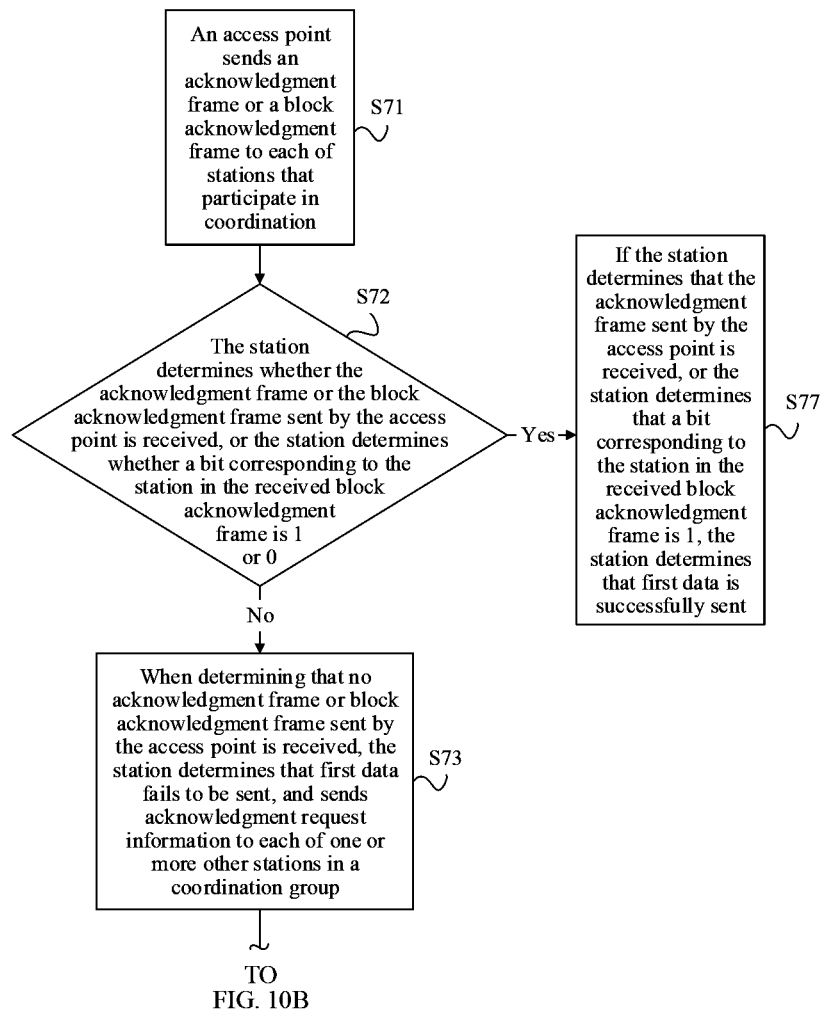
FIG. 10A and FIG. 10B are a schematic flowchart of confirming of a data sending result according to an embodiment.
Figure 10B:
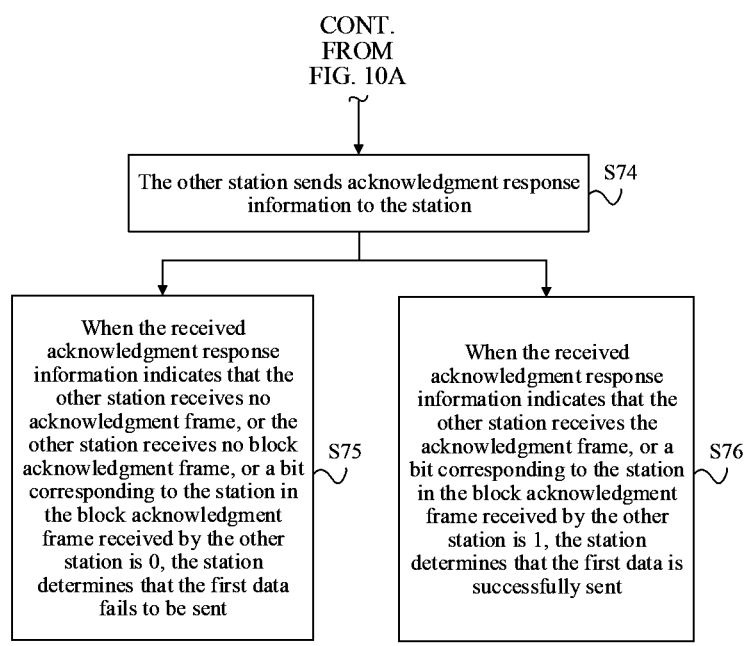

FIG. 10A and FIG. 10B are a schematic flowchart of confirming of a data sending result according to an embodiment. It may be understood that this embodiment may be applied to an error recovery process after an access point AP receives a first aggregated frame sent by a station and a second aggregated frame or frames sent by one or more other stations. This embodiment may also be applied to another scenario. This is not limited herein. Herein, a scenario in which the access point AP receives the first aggregated frame sent by the station and the second aggregated frame sent by each of the one or more other stations is used as an example for description. As shown in FIG. 10A and FIG. 10B, the method includes the following steps.

S71: The access point sends an acknowledgment frame or a block acknowledgment frame to each of stations that participate in coordination.

S72: The station determines whether the acknowledgment frame or the block acknowledgment frame sent by the access point is received, or the station determines whether a bit corresponding to the station in the received block acknowledgment frame is 1 or 0.

For example, an acknowledgment frame (Acknowledgment, or ACK) means that when the station receives the acknowledgment frame, it indicates that data sent by the station to the access point is correctly received by the access point. When the station receives no acknowledgment frame, it indicates that data sent by the station to the access point is not correctly received by the access point. A block acknowledgment frame (Block Acknowledgment, or BA) uses a bitmap form, and each bit in the bitmap corresponds to one MAC service data unit (MSDU). When the station receives no block acknowledgment frame, it indicates that data sent by all stations in a coordination group to the access point is not correctly received by the access point. When the station receives the block acknowledgment frame, if the station determines that a bit corresponding to the station is 0, the station determines that the data sent by the station to the access point is not correctly received by the access point; or if the station determines that a bit corresponding to the station is 1, the station determines that the data sent by the station to the access point is correctly received by the access point.

After receiving aggregated frames sent by the stations that participate in coordination, the access point needs to send feedback information to the stations that participate in coordination, where the feedback information is the acknowledgment frame or the block acknowledgment frame.

S73: When determining that no acknowledgment frame or block acknowledgment frame sent by the access point is received, the station sends acknowledgment request information to each of the one or more other stations in the coordination group. The acknowledgment frame indicates that the access point successfully receives the first aggregated frame, and the acknowledgment request information is used to determine whether any one of the one or more other stations receives the acknowledgment frame or the block acknowledgment frame.

For example, in the first case, after step S72, if the station determines that no acknowledgment frame or block acknowledgment frame sent by the access point is received, the station needs to query the one or more other stations in the coordination group. Further, the station sends the acknowledgment request information to each of the one or more other stations that participate in coordination, to query whether the other station receives the acknowledgment frame or the block acknowledgment frame.

S74: The other station sends acknowledgment response information to the station.

For example, the acknowledgment response information indicates whether the other station receives the acknowledgment frame or the block acknowledgment frame. When the acknowledgment response information indicates that any one of the one or more other stations receives the block acknowledgment frame, the acknowledgment response information carries specific information in the block acknowledgment frame.

S75: When the received acknowledgment response information indicates that any one of the one or more other stations receives no acknowledgment frame, or the other station receives no block acknowledgment frame, or a bit corresponding to the station in the block acknowledgment frame received by the other station is 0, the station determines that first data fails to be sent.

For example, after step S74, after the station receives the acknowledgment response information, if the station determines that the acknowledgment response information indicates that any one of the one or more other stations receives no acknowledgment frame, the station determines that the data sent by the station to the access point is not correctly received by the access point. If the station determines that the acknowledgment response information indicates that any one of the one or more other stations receives no block acknowledgment frame, the station determines that data sent by all the stations in the coordination group to the access point is not correctly received by the access point, and may certainly determine that the data sent by the station to the access point is not correctly received by the access point. If the station determines that the acknowledgment response information indicates that a bit corresponding to the current station in the block acknowledgment frame received by the other station is 0, the station determines that the data sent by the station to the access point is not correctly received by the access point.

Further, the stations in the coordination group may perform retransmission.

S76: When the received acknowledgment response information indicates that any one of the one or more other stations receives the acknowledgment frame, or a bit corresponding to the station in the block acknowledgment frame received by the other station is 1, the station determines that first data is successfully sent.

For example, after step S74, after the station receives the acknowledgment response information, if the station determines that the acknowledgment response information indicates that other station receives the acknowledgment frame, the station determines that the data sent by the station to the access point is correctly received by the access point. Alternatively, if the station determines that the acknowledgment response information indicates that a bit corresponding to the current station in the block acknowledgment frame received by the other station is 1, the station determines that data sent by the station to the access point is correctly received by the access point.

Then, the station does not need to perform retransmission.

S77: If the station determines that the acknowledgment frame sent by the access point is received, where the acknowledgment frame indicates that the access point successfully receives the first aggregated frame; or if the station determines that a bit corresponding to the station in the received block acknowledgment frame is 1, the station determines that the first data is successfully sent.

For example, in the second case, after S72, if the station determines that the acknowledgment frame sent by the access point is received, the station determines that the access point successfully receives the data sent by the station. Alternatively, if the station determines that the block acknowledgment frame sent by the access point is received, and a bit corresponding to the station in the acknowledgment frame is 1, the station determines that the access point successfully receives the data sent by the station.

In this solution, when determining that no acknowledgment frame or block acknowledgment frame sent by the access point is received, the station queries the one or more other stations in the coordination group about whether the acknowledgment frame or the block acknowledgment frame is received. This avoids retransmission of the station, reduces transmission overheads, and saves network resources.

Figure 11:
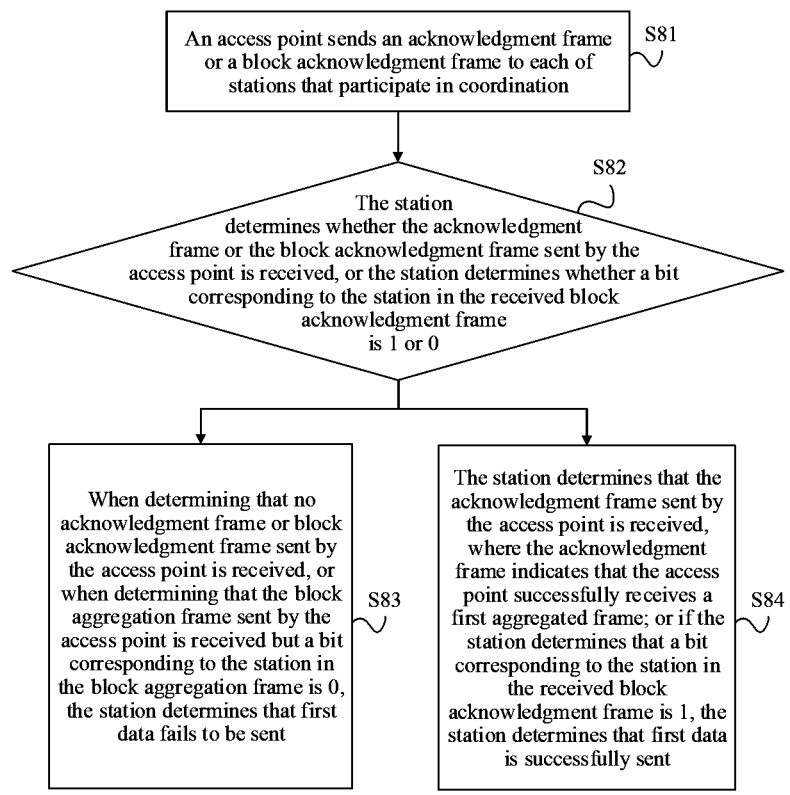
FIG. 11 is a schematic flowchart of another confirming of a data sending result according to an embodiment.

FIG. 11 is a schematic flowchart of another confirming of a data sending result according to an embodiment. It may be understood that this embodiment may be applied to an error recovery process after an access point AP receives a first aggregated frame sent by a station and a second aggregated frame or frames sent by one or more other stations. This embodiment may also be applied to another scenario. This is not limited herein. Herein, a scenario in which the access point AP receives the first aggregated frame sent by the station and the second aggregated frame sent by each of the one or more other stations is used as an example for description. As shown in FIG. 11, the method includes the following steps.

S81: The access point sends an acknowledgment frame or a block acknowledgment frame to each of stations that participate in coordination.

S82: The station determines whether the acknowledgment frame or the block acknowledgment frame sent by the access point is received, or the station determines whether a bit corresponding to the station in the received block acknowledgment frame is 1 or 0.

For example, for descriptions of the acknowledgment frame and the block acknowledgment frame, refer to steps S71 and S72 in FIG. 10A.

For the first case, in S83, when determining that no acknowledgment frame or block acknowledgment frame sent by the access point is received, or when determining that the block acknowledgment frame sent by the access point is received but a bit corresponding to the station in the block acknowledgment frame is 0, the station determines that first data fails to be sent. In this case, the station may perform retransmission.

For example, after S82, if the station determines that no acknowledgment frame sent by the access point is received, the station determines that the access point receives no aggregated frame sent by the station. Then, the station may perform retransmission.

Alternatively, if the station determines that no block acknowledgment frame sent by the access point is received, the station determines that data sent by all stations in a coordination group to the access point is not correctly received by the access point, and may certainly determine that the access point receives no aggregated frame sent by the station. Then, the station may perform retransmission.

Alternatively, if the station determines that the block acknowledgment frame sent by the access point is received, but a bit corresponding to the station in the block acknowledgment frame is 0, the station determines that the access point receives no aggregated frame sent by the station. Then, the station may perform retransmission.

For the second case, in S84, the station determines that the acknowledgment frame sent by the access point is received, where the acknowledgment frame indicates that the access point successfully receives the first aggregated frame; if the station determines that a bit corresponding to the station in the received block acknowledgment frame is 1, the station determines that first data is successfully sent.

For example, after S82, if the station determines that the acknowledgment frame sent by the access point is received, the station determines that the access point successfully receives the data sent by the station. Alternatively, if the station determines that the block acknowledgment frame sent by the access point is received, and a bit corresponding to the station in the acknowledgment frame is 1, the station determines that the access point successfully receives the data sent by the station.

Then, the station does not need to perform data retransmission.

In this embodiment, when the access point successfully receives the aggregated frame, the access point needs to notify the station, to prevent the station from re-sending data to the access point, thereby saving network resources. When determining that the access point does not successfully receive the aggregated frame, the station needs to repeatedly perform a process of sending the aggregated frame, to ensure that the access point can receive the aggregated frame.

Figure 12:
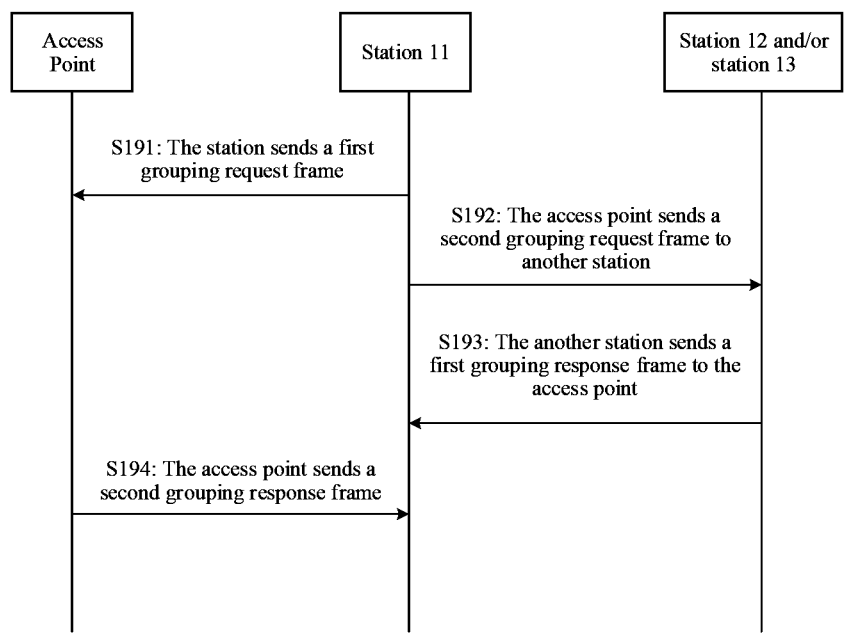
FIG. 12 is a schematic interaction flowchart of establishment of a coordination group by stations according to an embodiment.

FIG. 12 is a schematic interaction flowchart of establishment of a coordination group by stations according to an embodiment. As shown in FIG. 12, the method includes the following steps.

S191: A station sends a first grouping request frame to an access point, where the first grouping request frame is used to request to form a coordination group with another station.

For example, the station sends a first grouping request frame (grouping request 1) to the access point, where the first grouping request frame indicates that the station requests to form a coordination group with another station.

S192: The access point sends a second grouping request frame to another station, where the second grouping request frame includes an identifier of the coordination group.

For example, the access point sends a second grouping request frame (grouping request 2) to another station, where the second grouping request frame includes an identifier (Group ID) of the coordination group.

S193: The another station sends a first grouping response frame to the access point, where the first grouping response frame indicates that the another station determines to form the coordination group with the station.

For example, the another station sends a first grouping response frame (grouping response 1) to the access point, where the first grouping response frame indicates that the another station agrees to form the coordination group with the station.

S194: The access point sends a second grouping response frame to the station, where the second grouping response frame includes the identifier of the coordination group, and indicates that the another station determines to form the coordination group with the station.

For example, the access point sends a second grouping response frame (grouping response 2) to the station, where the second grouping response frame indicates that the station and the another station successfully form a group, and the second grouping response frame includes the identifier of the coordination group. The identifier of the coordination group may be allocated by the access point, and the identifier of the coordination group is used to identify that the station and the another station form the coordination group.

When still another station needs to be included, the station sends a fourth grouping request frame (grouping request 4) to the access point, where the fourth grouping request frame indicates that the station requests to include the still another station in the coordination group. The access point sends a fifth grouping request frame (grouping request 5) to the still another station, where the fifth grouping request frame includes the identifier of the coordination group. The still another station sends a fourth grouping response frame (grouping response 4) to the access point, where the fourth grouping response frame indicates that the still another station agrees to join the coordination group. The access point sends a fifth grouping response frame (grouping response 5) to the station, where the fifth grouping response frame indicates that it is confirmed that the still another station successfully joins the coordination group, and the fifth grouping response frame includes the identifier of the coordination group. When still yet another station needs to be included, the foregoing process is repeated.

In this embodiment, the station initiates a grouping request to the access point, to request to form a coordination group with another station. Then, a coordination group may be established, and a plurality of stations in the coordination group may complete the coordination process in the foregoing embodiment. This reduces a transmit power of the station, reduces a current of the station, and prolongs a service lifespan of the station.

Figure 13:
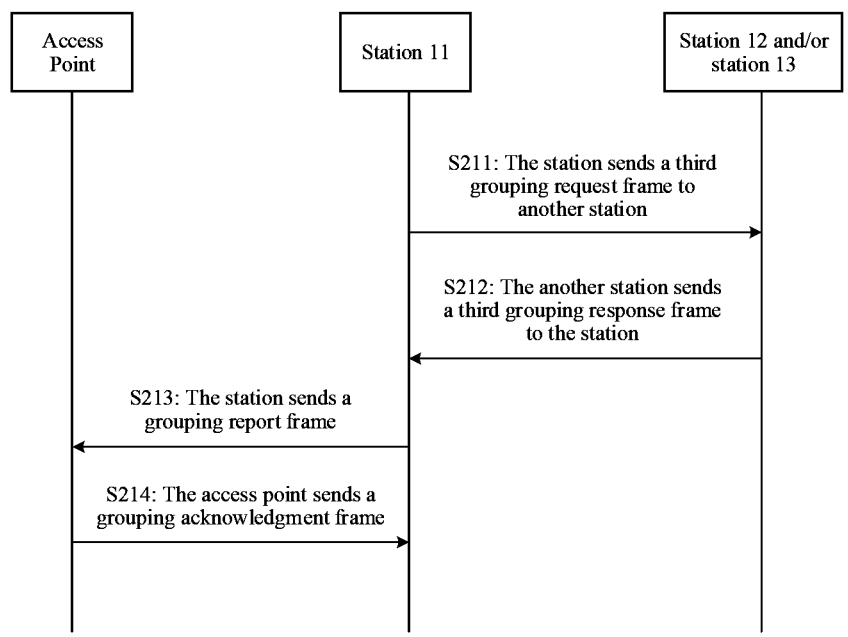
FIG. 13 is a schematic interaction flowchart of another establishment of a coordination group by stations according to an embodiment.

FIG. 13 is a schematic interaction flowchart of another establishment of a coordination group by stations according to an embodiment. As shown in FIG. 13, the method includes the following steps.

S211: A station sends a third grouping request frame to another station, where the third grouping request frame is used to request to form a coordination group with the another station, and the third grouping request frame includes an identifier of the coordination group.

For example, the station allocates an identifier of a coordination group. The station sends a third grouping request frame (grouping request 3) to another station, where the third grouping request frame indicates that the station requests to form a coordination group with the another station, and the third grouping request frame carries the identifier of the coordination group.

S212: The another station sends a third grouping response frame to the station, where the third grouping response frame indicates that the another station determines to form the coordination group with the station.

For example, the another station sends a third grouping response frame (grouping response 3) to the station, where the third grouping response frame indicates that the another station agrees to form the coordination group with the station.

When still another station needs to be included, the station sends a sixth grouping request frame (grouping request 6) to the still another station, where the sixth grouping request frame indicates that the station requests the still another station to join the coordination group, and the sixth grouping request frame carries the identifier of the coordination group. The still another station sends a sixth grouping response frame (grouping response 6) to the station, and the sixth grouping response frame indicates that the still another station agrees to join the coordination group. When still yet another station needs to be included, the foregoing process is repeated.

S213: The station sends a grouping report frame to the access point, where the grouping report frame includes the identifier of the coordination group.

For example, the station sends a grouping report frame to the access point.

S214: The access point sends a grouping confirm frame to the station.

For example, the access point sends a grouping confirm frame to the station.

In this embodiment, the station initiates a grouping request to another station, to request to form a coordination group with the another station. Then, the station sends information about the formed coordination group to the access point. In this case, the coordination group is established, and a plurality of stations in the coordination group may complete the coordination process in the foregoing embodiment. This reduces a transmit power of the station, reduces a current of the station, and prolongs a service lifespan of the station.

The foregoing describes in detail the data transmission method in the embodiments of this application, and the following describes a data transmission apparatus in the embodiments of this application.

The embodiments of this application describe in detail a schematic structure of a data transmission apparatus on a station side.

Figure 14:
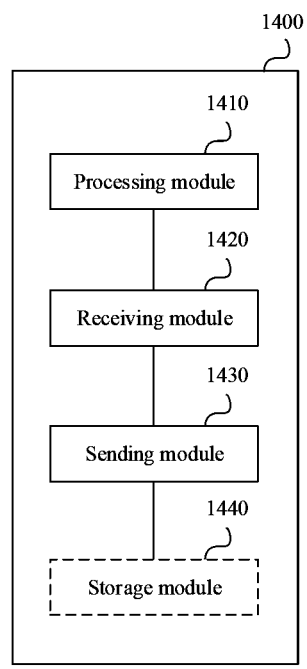
FIG. 14 is a schematic block diagram of a data transmission apparatus 1400 on a station side according to an embodiment.

In an example, FIG. 14 is a schematic block diagram of a data transmission apparatus 1400 on a station side according to an embodiment. The apparatus 1400 in this embodiment of this application may be the station in the foregoing method embodiments, or may be one or more chips in the station. The apparatus 1400 may be configured to implement some or all functions of the station in the foregoing method embodiment. As shown in FIG. 14, the apparatus 1400 may include a processing module 1410, a receiving module 1420, and a sending module 1430. In an embodiment, the apparatus 1400 may further include a storage module 1440.

For example, the processing module 1410 may be configured to perform step S13 or step S14 in FIG. 4 in the foregoing method embodiment. The processing module 1410 may be configured to perform step S24 or step S25 in FIG. 5 in the foregoing method embodiment. The processing module 1410 may be configured to perform step S34 or step S35 in FIG. 7 in the foregoing method embodiment. The processing module 1410 may be configured to perform step S44 or step S45 in FIG. 9 in the foregoing method embodiment. The processing module 1410 may be configured to perform step S72 in FIG. 10A, or step S75, step S76, or step S77 in FIG. 10B in the foregoing method embodiment. The processing module 1410 may be configured to perform step S82, step S83, or step S84 in FIG. 11 in the foregoing method embodiment. The receiving module 1420 may be configured to perform step S11 in FIG. 4 in the foregoing method embodiment. The receiving module 1420 may be configured to perform step S22 in FIG. 5 in the foregoing method embodiment. The receiving module 1420 may be configured to perform step S32 in FIG. 7 in the foregoing method embodiment. The receiving module 1420 may be configured to perform step S42 in FIG. 9 in the foregoing method embodiment.

The sending module 1430 may be configured to perform step S12, step S15, or step S16 in FIG. 4 in the foregoing method embodiment. The sending module 1430 may be configured to perform step S23, step S26, or step S27 in FIG. 5 in the foregoing method embodiment. The sending module 1430 may be configured to perform step S33, step S36, or step S37 in FIG. 7 in the foregoing method embodiment. The sending module 1430 may be configured to perform step S43, step S46, or step S47 in FIG. 9 in the foregoing method embodiment. The processing module 1430 may be configured to perform step S73 in FIG. 10A or step S74 in FIG. 10B in the foregoing method embodiment. The sending module 1430 may be configured to perform the sending step in step S83 in FIG. 11 in the foregoing method embodiment. The sending module 1430 may be configured to perform step S191, or step S193 in FIG. 12 in the foregoing method embodiment. The sending module 1430 may be configured to perform step S211, step S212, or step S213 in FIG. 13 in the foregoing method embodiment.

Alternatively, the apparatus 1400 may be configured as a general-purpose processing system, for example, a chip. The processing module 1410 may include one or more processors that provide a processing function. The receiving module 1420 may be, for example, an input interface, a pin, or a circuit. The sending module 1430 may be, for example, an output interface, a pin, or a circuit. The input/output interface may be configured to be responsible for information exchange between the chip system and the external. For example, the input/output interface may output an aggregated frame generated by the station to another module outside the chip for processing. The processing module may execute a computer-executable instruction stored in the storage module, to implement a function of the station in the foregoing method embodiment. In an example, the storage module 1440 optionally included in the apparatus 1400 may be a storage unit in a chip, such as a register or a cache. The storage module 1440 may alternatively be a storage unit located outside the chip in the station, for example, a read-only memory (ROM) or another type of static storage device that can store static information and an instruction, or a random access memory (RAM).

Figure 15:
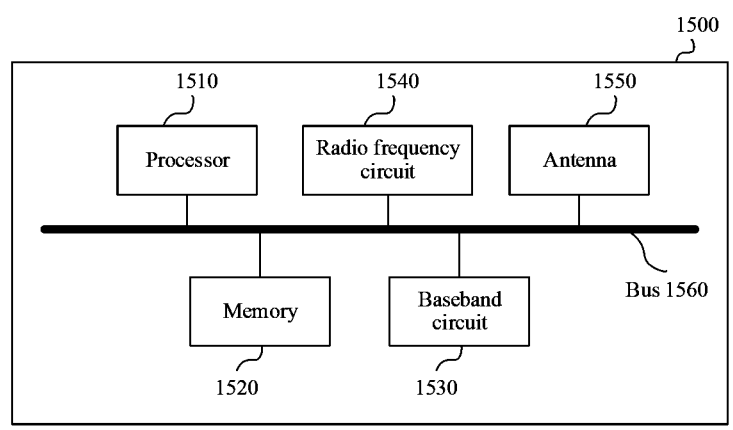
FIG. 15 is a schematic block diagram of a data transmission apparatus 1500 on a station side according to an embodiment.

In another example, FIG. 15 is a schematic block diagram of a data transmission apparatus 1500 on a station side according to an embodiment. The apparatus 1500 in this embodiment may be the station in the foregoing method embodiment, and the apparatus 1500 may be configured to implement some or all functions of the station in the foregoing method embodiment. The apparatus 1500 may include a processor 1510, a baseband circuit 1530, a radio frequency circuit 1540, and an antenna 1550. In an embodiment, the apparatus 1500 may further include a memory 1520. All the components of the apparatus 1500 are coupled together by using a bus 1560. The bus system 1560 includes a data bus, and further includes a power bus, a control bus, and a status signal bus. However, for clear description, in the figure, various types of buses are marked as the bus system 1560.

The processor 1510 may be configured to control the station, and is configured to perform processing performed by the station in the foregoing embodiment. The processor 1510 may perform a processing process related to the station in the foregoing method embodiment and/or other processes of the technology described in this application, and may further run an operating system. The processor 1510 is responsible for managing a bus, and may execute a program or an instruction stored in the memory.

The baseband circuit 1530, the radio frequency circuit 1540, and the antenna 1550 may be configured to support information receiving and sending between the station and the access point in the foregoing embodiment, to support wireless communication between the station and the access point, and further configured to support signaling and information exchange between the station and another station, to implement coordination between stations.

In an example, an acknowledgment frame or a block acknowledgment frame sent by the access point is received through the antenna 1550. Then, the acknowledgment frame or the block acknowledgment frame is processed by the radio frequency circuit 1540 through processing such as filtering, amplification, down-conversion, and digitization; processed by the baseband circuit 1530 through baseband processing such as decoding and protocol-based data decapsulation; and then processed by the processor 1510. In another example, the processor 1510 generates first data, second data, or an aggregated frame. Then, the first data, the second data, or the aggregated frame is processed by the baseband circuit 1530 through baseband processing such as encoding and protocol-based encapsulation; processed by the radio frequency circuit 1540 through radio frequency processing such as analog conversion, filtering, amplification, and up-conversion; and transmitted through the antenna 1550.

The memory 1520 may be configured to store program code and data of the station, and the memory 1520 may be the storage module 1440 in FIG. 14. It can be understood that the baseband circuit 1530, the radio frequency circuit 1540, and the antenna 1550 may be further configured to support communication between the station and another network entity, for example, communication between the station and a network element on a core network side. In FIG. 15, the memory 1520 is shown as separated from the processor 1510. However, a person skilled in the art readily figures out that the memory 1520 or any portion thereof may be located outside the apparatus 1500. For example, the memory 1520 may include a transmission cable and/or a computer product separated from a wireless node. These media may be accessed by the processor 1510 through the bus interface 1560. Alternatively, the memory 1520 or any portion thereof may be integrated into the processor 1510, for example, may be a cache and/or a general purpose register.

It can be understood that FIG. 15 merely shows a simplified design of the station. For example, in actual application, the station may include any quantity of transmitters, receivers, processors, memories, and the like, and all stations that may implement the present invention fall within the protection scope of the present invention.

In an embodiment, the data transmission apparatus on the station side may alternatively be implemented by using one or more field-programmable gate arrays (FPGA), a programmable logic device (PLD), a controller, a state machine, gate logic, a discrete hardware component, any other proper circuit, or any combination of circuits that can implement various functions described in this application. In still another example, an embodiment of this application further provides a computer storage medium. The computer storage medium may store a program instruction used to indicate any one of the foregoing methods, so that a processor is enabled to execute the program instruction to implement the method and the function related to the station in the foregoing method embodiment.

Figure 16:
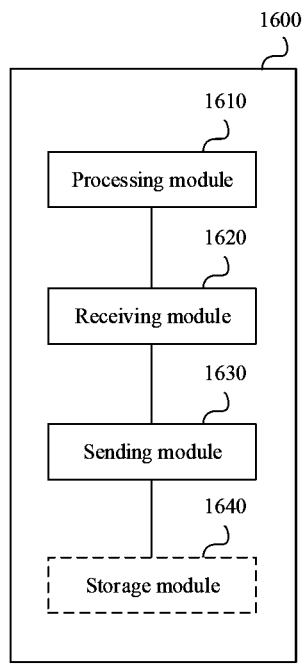
FIG. 16 is a schematic block diagram of a data transmission apparatus 1600 on an access point side according to an embodiment.

The embodiments of this application describe in detail a schematic structure of a data transmission apparatus on an access point side. In an example, FIG. 16 is a schematic block diagram of a data transmission apparatus 1600 on an access point side according to an embodiment. The apparatus 1600 in this embodiment of this application may be the access point in the foregoing method embodiment, or may be one or more chips in the access point. The apparatus 1600 may be configured to implement some or all functions of the access point in the foregoing method embodiment. The apparatus 1600 may include a processing module 1610, a receiving module 1620, and a sending module 1630. In an embodiment, the apparatus 1600 may further include a storage module 1640.

For example, the receiving module 1620 may be configured to receive an aggregated frame from a station in step S15 and step S16 in FIG. 4 in the foregoing method embodiment, or configured to receive an aggregated frame from a station in step S26 and step S27 in FIG. 5; or configured to receive an aggregated frame from a station in step S36 and step S37 in FIG. 7; or configured to receive an aggregated frame from a station in step S46 and step S47 in FIG. 9. The receiving module 1620 may be configured to receive a first grouping request frame from a station in step S191 in FIG. 12; or receive a first grouping response frame from a station in step 193 in FIG. 12; or configured to receive a grouping report frame from a station in step S213 in FIG. 13.

The sending module 1630 may be configured to perform step S21 in FIG. 5 in the foregoing method embodiment; or configured to perform step S31 in FIG. 7; or configured to perform step S71 in FIG. 10A; or configured to perform step S81 in FIG. 11; or configured to perform step S192 and step S194 in FIG. 12; or configured to perform step S212 and step S214 in FIG. 13.

The processing module 1610 may be configured to generate a trigger frame, or configured to generate an acknowledgment frame or a block acknowledgment frame.

Alternatively, the apparatus 1600 may be configured as a general-purpose processing system, for example, a chip. The processing module 1610 may include one or more processors that provide a processing function. The receiving module 1620 may be, for example, an input interface, a pin, or a circuit. The sending module 1630 may be, for example, an output interface, a pin, or a circuit. The input/output interface may be configured to be responsible for information exchange between the chip system and the external. For example, the input interface may output an aggregated frame sent by a station to another module outside the chip for processing. The one or more processors may execute a computer execution instruction stored in the storage module, to implement functions of the access point in the foregoing method embodiment. In an example, the optional storage module 1640 in the apparatus 1600 may be a storage unit inside the chip, for example, a register or a cache. Alternatively, the storage module 1640 may be a storage unit outside the chip in the access point, for example, a ROM, a static storage device of another type that can store static information and instructions, or a RAM.

Figure 17:
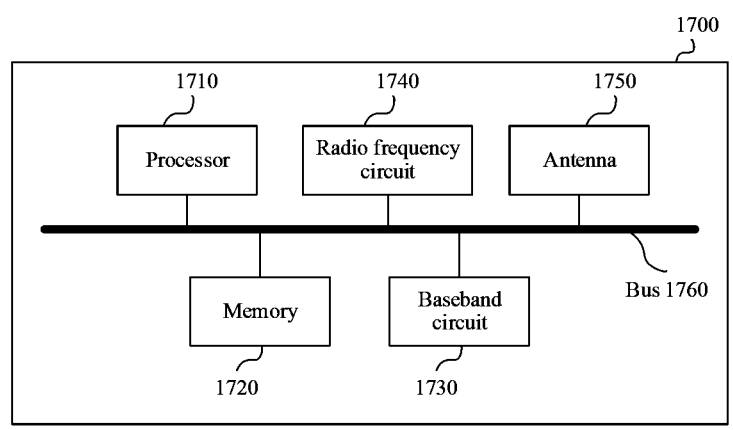
FIG. 17 is a schematic block diagram of a data transmission apparatus 1700 on an access point side according to an embodiment.

In another example, FIG. 17 is a schematic block diagram of another data transmission apparatus 1700 on an access point side according to an embodiment. The apparatus 1700 in this embodiment of this application may be the access point in the foregoing method embodiment, and the apparatus 1700 may be configured to implement some or all functions of the access point in the foregoing method embodiment. The apparatus 1700 may include a processor 1710, a baseband circuit 1730, a radio frequency circuit 1740, and an antenna 1750. In an embodiment, the apparatus 1700 may further include a memory 1720. All the components of the apparatus 1700 are coupled together by using a bus 1760. The bus system 1760 includes a data bus, and further includes a power bus, a control bus, and a status signal bus. However, for clear description, in the figure, various types of buses are marked as the bus system 1760.

The processor 1710 may be configured to control the access point, and is configured to perform processing performed by the access point in the foregoing embodiments. The processor 1710 may perform a processing process related to the access point in the foregoing method embodiments and/or other processes of the technology described in this application, and may further run an operating system. The processor 1710 is responsible for managing a bus, and may execute a program or an instruction stored in the memory.

The baseband circuit 1730, the radio frequency circuit 1740, and the antenna 1750 may be configured to support information receiving and sending between the access point and the station in the foregoing embodiment, to support wireless communication between the access point and the station. In an example, an aggregated frame sent by the station is received through the antenna 1750. Then, the aggregated frame is processed by the radio frequency circuit 1740 through processing such as filtering, amplification, down-conversion, and digitization; processed by the baseband circuit 1730 through baseband processing such as decoding and protocol-based data decapsulation; and then processed by the processor 1710. In another example, an acknowledgment frame or a block acknowledgment frame of the access point may be processed by the processor 1710; processed by the baseband circuit 1730 through baseband processing such as encoding and protocol-based encapsulation; processed by the radio frequency circuit 1740 through radio frequency processing such as analog conversion, filtering, amplification, and up-conversion; and transmitted through the antenna 1750. The memory 1720 may be configured to store program code and data of the station, and the memory 1720 may be the storage module 1640 in FIG. 16. It may be understood that the baseband circuit 1730, the radio frequency circuit 1740, and the antenna 1750 may be further configured to support the access point in communicating with another network entity, for example, configured to support the access point in communicating with a station associated with the access point, for example, the station shown in FIG. 3.

It can be understood that FIG. 17 merely shows a simplified design of the access point. For example, in actual application, the access point may include any quantity of transmitters, receivers, processors, memories, and the like, and all access points that may implement the present invention fall within the protection scope of the present invention.

In an embodiment, the data transmission apparatus on the access point side may also be implemented by using one or more FPGAs, a PLD, a controller, a state machine, gate logic, a discrete hardware component, any other suitable circuit, or any combination of circuits that can implement various functions described in this application.

In still another example, an embodiment of this application further provides a computer storage medium. The computer storage medium may store a program instruction used to indicate any one of the foregoing methods, so that a processor is enabled to execute the program instruction to implement the method and the function related to the access point in the foregoing method embodiment.

The processor in each of the apparatus 1500 and the apparatus 1700 may be a general purpose processor, for example, a general purpose central processing unit (CPU), a network processor (NP), or a microprocessor, or may be an application-specific integrated circuit (ASIC), or one or more integrated circuits configured to control program execution in the solutions of this application. Alternatively, the processor may be a digital signal processor (DSP), a field-programmable gate array (FPGA) or another programmable logic device, a discrete gate or a transistor logic device, or a discrete hardware component. Alternatively, the controller/processor may be a combination of processors implementing a computing function, for example, a combination of one or more microprocessors, or a combination of a DSP and a microprocessor. The processor usually performs logical and arithmetic operations based on a program instruction stored in the memory.

The memory in each of the apparatus 1600 and the apparatus 1700 may further store an operating system and another application program. Specifically, the program may include program code, and the program code includes a computer operation instruction. More specifically, the foregoing memory may be a ROM, a static storage device of another type that can store static information and an instruction, a RAM, a dynamic storage device of another type that can store information and an instruction, a magnetic disk memory, or the like. The memory may be a combination of the foregoing memories. In addition, the computer readable storage medium/memory may be located in the processor, or may be located outside the processor, or distributed in a plurality of entities including a processor or a processing circuit. The computer readable storage medium/memory may be specifically embodied in a computer program product. For example, the computer program product may include a computer readable medium in a packaging material.

An embodiment of this application provides a communications system. The communications system includes the data transmission apparatus on at least one station side provided in FIG. 14 and the data transmission apparatus on the access point side provided in FIG. 16.

In the several embodiments provided in this application, it should be understood that the disclosed system, apparatus, and method may be implemented in other manners. For example, the described apparatus embodiment is merely an example. For example, division into units is merely logical function division and may be other division in actual implementation. For example, a plurality of units or components may be combined or integrated into another system, or some features may be ignored, or do not execute. In addition, the displayed or discussed mutual couplings or direct couplings or communication connections may be implemented by using some interfaces. The indirect couplings or communication connections between the apparatuses or units may be implemented in an electronic form, a mechanical form, or another form.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instruction is loaded and executed on a computer, the procedures or functions according to this application are all or partially generated. The computer may be a general-purpose computer, a special-purpose computer, a computer network, or another programmable apparatus. The computer instructions may be stored in a computer readable storage medium, or transmitted from one computer readable storage medium to another computer readable storage medium. For example, the computer instructions may be sent from a website, computer, server, or data center to another website, computer, server, or data center in a wired (for example, a coaxial cable, an optical fiber, or a digital subscriber line) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid-State Disk), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for data transmission, comprising:
   receiving, by a station, second data of one or more other stations, different from the station, in a coordination group to which the station belongs;
   sending, by the station, first data to each of the one or more other stations, so that each of the one or more other stations generates a second aggregated frame, wherein the second aggregated frame comprises the first data and the second data; and
   sending, by the station, a first aggregated frame to an access point, wherein the first aggregated frame comprises the first data and the second data, a time at which the station sends the first aggregated frame is the same as a time at which each of the one or more other stations sends the second aggregated frame to the access point, and an aggregation order of the first data and the second data in the first aggregated frame is the same as an aggregation order of the first data and the second data in the second aggregated frame;
wherein a transmit power at which the station sends the first aggregated frame is less than a power at which the station sends only the first data to the access point, and a transmit power at which each of the one or more other stations sends the second aggregated frame is less than a power at which each of the one or more other stations sends only the second data to the access point.

2. The method according to claim 1, wherein the transmit power of the station is the power at which the station sends only the first data to the access point multiplied by a transmit power coefficient of the station, and for any one of the one or more other stations, a transmit power of the station is the power at which the other station sends only the second data multiplied by a transmit power coefficient of the other station, wherein the transmit power coefficient of the station is greater than 0 and less than 1, the transmit power coefficient of the other station is greater than 0 and less than 1, and a sum of the transmit power coefficient of the station and transmit power coefficients of the one or more other stations is greater than or equal to 1.

3. The method according to claim 2, wherein the transmit power coefficient of the station is equal to the transmit power coefficient of each of the one or more other stations, and a value of the transmit power coefficient is 1/N, wherein N is a total quantity of the station and the one or more other stations, and N is a positive integer greater than or equal to 2.

4. The method according to claim 2, further comprising: before receiving the second data of the one or more other stations,
receiving, by the station, a trigger frame broadcast by the access point, wherein the trigger frame comprises information required by the station for determining the transmit power of the station.

5. The method according to claim 4, wherein the information required for determining the transmit power of the station comprises: the transmit power coefficient of the station, and the trigger frame further comprises the transmit power coefficients of the one or more other stations.

6. A data transmission apparatus on a station side, comprising:
a transceiver, configured to
receive second data of one or more other stations, different from the station, in a coordination group to which the station belongs;
send first data to each of the one or more other stations, so that each of the one or more other stations generates a second aggregated frame, wherein the second aggregated frame comprises the first data and the second data; and
at least one processor, configured to generate a first aggregated frame that comprises the first data and the second data;
wherein the transceiver is further configured to send the first aggregated frame to an access point, wherein a time at which the station sends the first aggregated frame is the same as a time at which each of the one or more other stations sends the second aggregated frame to the access point, and an aggregation order of the first data and the second data in the first aggregated frame is the same as an aggregation order of the first data and the second data in the second aggregated frame; and
wherein a transmit power at which the station sends the first aggregated frame is less than a power at which the station sends only the first data to the access point, and a transmit power at which each of the one or more other stations sends the second aggregated frame is less than a power at which each of the one or more other stations sends only the second data to the access point.

7. The apparatus according to claim 6, wherein the transmit power of the station is the power at which the station sends only the first data to the access point multiplied by a transmit power coefficient of the station, and a transmit power of the other station is the power at which the other station sends only the second data multiplied by a transmit power coefficient of the other station, wherein the transmit power coefficient of the station is greater than 0 and less than 1, the transmit power coefficient of the other station is greater than 0 and less than 1, and a sum of the transmit power coefficient of the station and transmit power coefficients of the one or more other stations is greater than or equal to 1.

8. The apparatus according to claim 7, wherein the transmit power coefficient of the station is equal to the transmit power coefficient of each of the one or more other stations, and a value of the transmit power coefficient is 1/N, wherein N is a total quantity of the station and the one or more other stations, and N is a positive integer greater than or equal to 2.

9. The apparatus according to claim 7, wherein before receiving the second data of the one or more other stations, the transceiver is further configured to:
receive a trigger frame broadcast by the access point, wherein the trigger frame comprises information required by the station for determining the transmit power of the station.

10. The apparatus according to claim 9, wherein the information required for determining the transmit power of the station comprises: the transmit power coefficient of the station, and the trigger frame further comprises the transmit power coefficients of the one or more other stations.

11. The apparatus according to claim 9, wherein first fields in user information fields that are in the trigger frame and that correspond to stations in the coordination group are the same, and a first field is used to indicate a resource unit that carries the aggregated frame; second fields in the user information fields that are in the trigger frame and that correspond to the stations in the coordination group are the same, and a second field is used to indicate a coding type of the aggregated frame; third fields in the user information fields that are in the trigger frame and that correspond to the stations in the coordination group are the same, and a third field is used to indicate a modulation and coding scheme of the aggregated frame; fourth fields in the user information fields that are in the trigger frame and that correspond to the stations in the coordination group are the same, and a fourth field is used to indicate dual-carrier modulation of the aggregated frame; and fifth fields in the user information fields that are in the trigger frame and that correspond to the stations in the coordination group are the same, and a fifth field is used to indicate spatial stream allocation.

12. The apparatus according to claim 6, wherein before the transceiver receives the second data of the one or more other stations, the transceiver is further configured to:
receive group target wake time information broadcast by the access point, wherein the group target wake time information is used to indicate stations in the coordination group to wake up; and
the processor is further configured to wake up based on the group target wake time information.

13. The apparatus according to claim 6, wherein to send the first aggregated frame to the access point, the transceiver is configured to:
send the first aggregated frame to the access point in a space-time block coding (STBC) scheme.

14. The apparatus according to claim 6, wherein after the transceiver sends the first aggregated frame to the access point, the transceiver is further configured to:
when it is determined that no acknowledgment frame or block acknowledgment frame sent by the access point is received, send acknowledgment request information to each of the one or more other stations in the coordination group, wherein the acknowledgment frame indicates that the access point successfully receives the first aggregated frame, and the acknowledgment request information is used to determine whether any of the one or more other stations receives the acknowledgment frame or the block acknowledgment frame;
the transceiver is further configured to receive acknowledgment response information sent by each of the one or more other stations;
the processor is further configured to:
when the received acknowledgment response information indicates that any of the one or more other stations receives no acknowledgment frame, or the other station receives no block acknowledgment frame, or a bit corresponding to the station in the block acknowledgment frame received by the other station is 0, determine that the first data fails to be sent; or
when the received acknowledgment response information indicates that any of the one or more other stations receives the acknowledgment frame, or a bit corresponding to the station in the block acknowledgment frame received by the other station is 1, determine that the first data is successfully sent.

15. A data transmission apparatus on an access point side, comprising:
a transceiver, configured to: receive a first aggregated frame sent by a station, and receive a second aggregated frame or frames sent by one or more other stations, different from the station, in a coordination group to which the station belongs;
wherein the first aggregated frame comprises first data and second data, the second aggregated frame comprises the first data and the second data, the first data is data of the station, the second data is data of the one or more other stations, and an aggregation order of the first data and the second data in the first aggregated frame is the same as an aggregation order of the first data and the second data in the second aggregated frame; and
wherein a transmit power at which the station sends the first aggregated frame is less than a power at which the station sends only the first data to the access point, and a transmit power at which each of the one or more other stations sends the second aggregated frame is less than a power at which each of the one or more other stations sends only the second data to the access point.

16. The apparatus according to claim 15, wherein the transmit power of the station is the power at which the station sends only the first data to the access point multiplied by a transmit power coefficient of the station, and a transmit power of the other station is the power at which the other station sends only the second data multiplied by a transmit power coefficient of the other station, wherein the transmit power coefficient of the station is greater than 0 and less than 1, the transmit power coefficient of the other station is greater than 0 and less than 1, and a sum of the transmit power coefficient of the station and transmit power coefficients of the one or more other stations is greater than or equal to 1.

17. The apparatus according to claim 16, wherein the transmit power coefficient of the station is equal to the transmit power coefficient of each of the one or more other stations, and a value of the transmit power coefficient is 1/N, wherein N is a total quantity of the station and the one or more other stations, and N is a positive integer greater than or equal to 2.

18. The apparatus according to claim 16, wherein before the transceiver receives the first aggregated frame sent by the station, and receives the second aggregated frame sent by each of the one or more other stations, the transceiver further configured to: broadcast a trigger frame that comprises information required by the station for determining the transmit power.

19. The apparatus according to claim 18, wherein the information required for determining the transmit power comprises: the transmit power coefficient of the station, and the trigger frame further comprises the transmit power coefficients of the one or more other stations.

20. The apparatus according to claim 18, wherein first fields in user information fields that are in the trigger frame and that correspond to stations in the coordination group are the same, and a first field is used to indicate a resource unit that carries the aggregated frame; second fields in the user information fields that are in the trigger frame and that correspond to the stations in the coordination group are the same, and a second field is used to indicate a coding type of the aggregated frame; third fields in the user information fields that are in the trigger frame and that correspond to the stations in the coordination group are the same, and a third field is used to indicate a modulation and coding scheme of the aggregated frame; fourth fields in the user information fields that are in the trigger frame and that correspond to the stations in the coordination group are the same, and a fourth field is used to indicate dual-carrier modulation of the aggregated frame; and fifth fields in the user information fields that are in the trigger frame and that correspond to the stations in the coordination group are the same, and a fifth field is used to indicate spatial stream allocation.

* * * * *